United States Patent
El-Ahmadi et al.

(10) Patent No.: US 7,580,637 B2
(45) Date of Patent: Aug. 25, 2009

(54) SYSTEMS AND METHODS FOR THE INTEGRATION OF FRAMING, OAM AND P, AND FORWARD ERROR CORRECTION IN PLUGGABLE OPTICAL TRANSCEIVER DEVICES

(75) Inventors: Siraj Nour El-Ahmadi, Dallas, TX (US); Salam El-Ahmadi, Dallas, TX (US); Gabriel E. Cardona, Richardson, TX (US); Adam R. Hotchkiss, Richardson, TX (US)

(73) Assignee: Menara Networks, Inc., Dallas, TX (US)

( * ) Notice: Subject to any disclaimer, the term of this patent is extended or adjusted under 35 U.S.C. 154(b) by 377 days.

(21) Appl. No.: 11/581,201

(22) Filed: Oct. 13, 2006

(65) Prior Publication Data

US 2008/0089693 A1    Apr. 17, 2008

(51) Int. Cl.
*H04B 10/24* (2006.01)
(52) U.S. Cl. .................................................. 398/135
(58) Field of Classification Search .......... 398/135–139
See application file for complete search history.

(56) References Cited

U.S. PATENT DOCUMENTS

| | | | |
|---|---|---|---|
| 7,286,762 B2* | 10/2007 | Elahmadi et al. | 398/77 |
| 2004/0030965 A1* | 2/2004 | Hadjihassan et al. | 714/704 |
| 2004/0033079 A1 | 2/2004 | Sheth et al. | |
| 2004/0159776 A1* | 8/2004 | Richard et al. | 250/214 R |
| 2005/0063711 A1 | 3/2005 | Rossi et al. | |
| 2007/0122148 A1* | 5/2007 | Welch et al. | 398/27 |
| 2008/0050074 A1* | 2/2008 | Dallesasse et al. | 385/92 |

OTHER PUBLICATIONS

Mark Telford; "Shrinking transceivers drive InP integration"; Technical Feature; M-Vs Review The Advanced Semiconductor Magazine; vol. 16, No. 5. Jun./Jul. 2003.

Kazuhiko Terada, Kenji Kawai, Osamu Ishida, Keiji Kishine, Noboru Iwasaki, and Haruhiko Ichino; Physical Layer OAM&P Signaling Method for 10 Gbit/s Ethernet Transport over Optical Networks; Paper; IEICE Trans. Commun., vol. E88-B, No. 10, Oct. 2005.

Kim Leeson et al., "A Cooperation Agreement for a Small Versatile 10 Gigabit Transceiver Package", X2 MSA, Issue 2.0b, Apr. 7, 2005, available at www.x2msa.org/MSA.asp.

(Continued)

*Primary Examiner*—Leslie Pascal
(74) *Attorney, Agent, or Firm*—Clements Bernard PLLC; Lawrence A. Baratta, Jr.; Adam R. Hotchkiss

(57) ABSTRACT

The present invention provides integrated framing in pluggable optical transceivers to extend the OTN framework into metro, regional, and core applications. Additionally, the present invention provides integrated FEC and optical layer OAM&P features into pluggable optical transceivers. This integration is done with existing pluggable transceivers defined by MSAs such as, but not limited to, XFP, XPAK, XENPAK, X2, XFP-E, and SFP+. Further, the present invention can be extended to new, emerging pluggable transceiver standards and specifications. The integration of framing, FEC, and optical layer OAM&P is done so that the pluggable transceiver preserves the specifications in the MSAs. This allows systems designed for existing pluggable transceivers to realize carrier-grade, robust performance without needed additional equipment such as transponders and without redesigning host equipment such as the line card to support new specifications.

23 Claims, 15 Drawing Sheets

OTHER PUBLICATIONS

Anthony Spilman, "A Cooperation Agreement for 10 Gigabit Transceiver Package", Xenpak MSA, Issue 3, Sep. 15, 2002, available at www.xenpack.org/MSA.asp.

SFF Committee, "10 Gigabit Small Form Factor Pluggable Module", INF-8077i, Revision 4.5, Aug. 31, 2005, available at http://www.xfpmsa.org/XFP_Rev4_5_SFF_INF_8077i.pdf.

* cited by examiner

US 7,580,637 B2

SYSTEMS AND METHODS FOR THE INTEGRATION OF FRAMING, OAM AND P, AND FORWARD ERROR CORRECTION IN PLUGGABLE OPTICAL TRANSCEIVER DEVICES

FIELD OF THE INVENTION

The present invention relates generally to optical networking, and more specifically to integrated framing functionality; optical layer operations, administration, maintenance, and provisioning (OAM&P); forward error correction (FEC); data encapsulation; and performance enhancement support in pluggable optical transceiver modules specified by multi-source agreements (MSAs) such as, for example, XENPAK, XPAK, X2, XFP, XFP-E and SFP+.

BACKGROUND OF THE INVENTION

The 10 Gigabit per second (Gbps) data rate (e.g., 9.96 Gbps for SONET OC-192 and SDH STM-64, 10.3 Gbps for GbE LAN PHY, and 10.5 Gbps for 10 G Fiber Channel) is emerging as the most dominant interface rate between servers, routers, Ethernet switches, multi-service provisioning platforms (MSPPs), cross-connects, etc. in core, regional, metro, access, and enterprise networks. Pluggable transceivers configured to provide a 10 Gbps optical signal have been adopted by equipment vendors as an effective way to decouple design and development of the physical optical interface from the rest of the open systems interconnect (OSI) layer two and above functions on line cards (also known as blades) in servers, routers, Ethernet switches, MSPPs, cross-connects, etc.

Pluggable transceivers are defined through multi-source agreements (MSAs). MSAs are agreements for specifications of pluggable transceivers agreed to by two or more vendors and promulgated for other vendors and network operators to utilize. MSAs allow other vendors to design transceivers to the same specifications reducing risk for vendors and operators, increasing flexibility, and accelerating the introduction of new technology. Six such MSAs include XFP, XPAK, XENPAK, X2, XFP-E and SFP+. Additionally, new MSAs are emerging to address new services and advanced technology. Each MSA defines the transceiver's mechanical characteristics, management interfaces, electrical characteristics, optical characteristics, and thermal requirements. Because of MSA specifications, MSA-compliant pluggable transceivers are standardized among equipment vendors and network operators to support multiple sources for pluggable transceivers and interoperability. As such, MSA-compliant pluggable transceivers have become the dominant form of optical transmitters and receivers in the industry.

Advantageously, MSA-compliant pluggable transceivers ensure engineering re-use and compatibility between various applications and the physical media dependent transceivers. Further, equipment vendors realize streamlined manufacturing and inventory control by removing wavelength specific decisions from the manufacturing process. For example, all line cards are manufactured the same, and the pluggable transceiver module with the desired wavelength (e.g. 850 nm, 1310 nm, 1550 nm, coarse wave division multiplexed (CWDM), dense wave division multiplexed (DWDM), etc.) is plugged in as a function of the specific application or development configuration. Network operators and service providers have adopted pluggable transceivers to reduce sparing costs. Further, significant cost reductions are realized by MSA standardization of pluggable transceivers because of multiple independent manufacturing sources.

The MSA specifications tightly define the mechanical characteristics, management interfaces, electrical characteristics, optical characteristics, and thermal requirements of pluggable transceivers. Advantageously, this enables interoperability among equipment vendors of pluggable transceivers, i.e. any MSA-compatible pluggable transceiver can be used in any host system designed to the MSA specification; however, these tightly defined characteristics limit the performance of pluggable transceivers since the MSA specifications were designed to maximize density and minimize cost, and not to provide advanced optical performance. To date, pluggable transceivers such as XFP, XPAK, XENPAK, X2, XFP-E, and SFP+ have been limited to short reach (less than 80 km) point-to-point applications without the need for high performance, extended reach, or advanced optical layer OAM&P. The MSA specifications have not addressed performance enhancements to enable pluggable transceivers to extend reach beyond 80 km and to provide carrier-grade optical management and performance. Where required to extend reach and to provide carrier-grade management and performance, host devices are designed with external circuitry interfaced to pluggable transceivers or pluggable transceivers are connected to optical transponders. As such, the use of pluggable transceivers to date has been limited to intra-office connections, short reach enterprise and metro networks (less than 80 km), and connection to an optical transponder capable of extended reach typically beyond 80 km.

Due to the low-cost, high-density, and widespread deployment of pluggable transceivers, both equipment vendors and network operators recognize a need to extend the benefits of pluggable transceivers to metro, regional and core network applications to enable carrier-grade wavelength division multiplexed (WDM) transport without the need for additional equipment such as optical transponders or additional circuitry performance enhancements. Such a need also must preserve the MSA mechanical characteristics, management interfaces, electrical characteristics, optical characteristics, and thermal requirements to maintain interoperability with existing host systems.

BRIEF SUMMARY OF THE INVENTION

In various exemplary embodiments, the present invention integrates framing in MSA-compliant pluggable optical transceivers to extend the OTN framework into metro, regional, and core applications. Additionally, the present invention integrates FEC and optical layer OAM&P features in MSA-compliant pluggable optical transceivers. This integration is done with existing pluggable transceivers defined by MSAs such as, but not limited to, XFP, XPAK, XENPAK, X2, XFP-E, and SFP+. Further, the present invention can be extended to new, emerging pluggable transceiver standards and specifications. This invention provides for the integration of data encapsulation, framing, FEC, optical reach extension and optical layer OAM&P in a manner that preserves the MSA specifications. This allows systems designed for existing pluggable transceivers to realize carrier-grade, robust performance without additional equipment such as transponders and without redesigning host systems such as the line card to support new specifications.

In one exemplary embodiment of the present invention, G.709 framing with overhead for optical layer OAM&P and FEC is integrated into XFP, XPAK, XENPAK, X2, XFP-E, and SFP+MSA specifications. This integration allows for on-chip OAM&P access through a subset of the G.709 overhead bytes or access to the entire G.709 overhead bytes in the pluggable transceiver. The OAM&P access is done through mechanisms fully compliant with the MSA specification. Additionally, G.709 FEC is added on the pluggable transceiver to extend optical reach, provide carrier-grade performance, and provide an additional layer of optical OAM&P through corrected error counts.

The present invention extends the benefits of pluggable transceivers beyond the current application space of short reach (less than 80 km) and interconnect applications to IP/Ethernet/ATM/Frame Relay/Fiber Channel over WDM applications, high density applications, high performance FEC applications, G.709 interconnection applications, and applications requiring comprehensive optical layer OAM&P. As such, the present invention eliminates the need to add additional equipment to support these applications such as transponders or the need to redesign existing hardware by complying with existing MSA specifications.

In an exemplary embodiment of the present invention, a pluggable optical transceiver defined by a multi-source agreement includes integrated circuitry configured to frame a signal with overhead for operations, administration, maintenance, & provisioning (OAM&P) functions necessary for optical transport networks (OTN) applications; wherein the pluggable optical transceiver with the integrated circuitry preserves the specifications for the multi-source agreement defining the pluggable optical transceiver. Optionally, the integrated circuitry is configured to frame the signal with a G.709 frame and the overhead comprises G.709 management data. Alternatively, the G.709 management data is either passed entirely to a host system or a subset of the G.709 management overhead is accessible and terminated on the pluggable optical transceiver; and wherein the G.709 management data is communicated through mechanisms fully supported by the multi-source agreement without requiring hardware re-design in the host system. Additionally, the pluggable optical transceiver of the present invention is utilized in applications requiring comprehensive operations, administration, maintenance, & provisioning support. Optionally, the overhead in the overhead comprises forward error correction overhead for performance enhancement and reach extension and the integrated circuitry is configured to correct errors in an optical signal utilizing the forward error correction overhead. Alternatively, the multi-source agreement comprises any of XFP, XPAK, XENPAK, X2, XFP-E, and SFP+.

In another exemplary embodiment of the present invention, a pluggable optical transceiver defined by a multi-source agreement includes integrated forward error correction circuitry, the circuitry is configured to add forward error correction overhead to a transmitted signal and to process forward error correction overhead on a received signal to correct errors; wherein the pluggable optical transceiver with the integrated forward error correction circuitry preserves the specifications for the multi-source agreement defining the pluggable optical transceiver. Optionally, the forward error correction circuitry is configured to frame the optical signal with a G.709 frame, the G.709 frame comprises overhead for operations, administration, maintenance, & provisioning overhead and the forward error correction overhead. Alternatively, the multi-source agreement comprises any of XFP, XPAK, XENPAK, X2, XFP-E, and SFP+.

In a third exemplary embodiment of the present invention, a pluggable optical transceiver defined by one of the XPAK, XENPAK, or X2 multi-source agreements includes G.709 framing circuitry integrated into the pluggable optical transceiver, the G.709 framing circuitry is configured to: frame an incoming signal with a G.709 frame comprising G.709 management overhead and forward error correction overhead and provide the signal in the G.709 frame to an optical transmitter; un-frame an incoming G.709 signal from an optical receiver and provide the unframed signal to a XAUI-XFI transceiver; and process G.709 management overhead and forward error correction overhead on the incoming G.709 signal; wherein the pluggable optical transceiver integrated with the framing circuitry preserves one of the XPAK, XENPAK, or X2 specifications. Optionally, the G.709 framing circuitry is further configured to: terminate a subset of the G.709 management overhead and pass the terminated overhead to a host system through mechanisms supported by one of the XPAK, XENPAK, or X2 specifications; and correct errors responsive to the forward error correction overhead and pass corrected error statistics to the host system through mechanisms supported by one of the XPAK, XENPAK, or X2 specifications. Alternatively, the G.709 framing circuitry is further configured to pass the entire G.709 management overhead to a host system through mechanisms supported by one of the XPAK, XENPAK, or X2 specifications; and correct errors responsive to the forward error correction overhead and pass corrected error statistics to the host system through mechanisms supported by one of the XPAK, XENPAK, or X2 specifications.

In yet another exemplary embodiment of the present invention, a pluggable optical transceiver defined by one of the XFP, XFP-E, or SFP+ multi-source agreements includes G.709 framing circuitry integrated into the pluggable optical transceiver, the G.709 framing circuitry is configured to frame an incoming signal with a G.709 frame comprising G.709 management overhead and forward error correction overhead and provide the signal in the G.709 frame to an optical transmitter; un-frame an incoming G.709 signal from an optical receiver and provide the unframed signal to a host system; and process G.709 management overhead and forward error correction overhead on the incoming G.709 signal; wherein the pluggable optical transceiver integrated with the framing circuitry preserves the XFP, XFP-E, or SFP+ specifications.

In another exemplary embodiment of the present invention, a method for designing a multi-source agreement pluggable transceiver for optical transport network applications includes determining the mechanical characteristics, management interfaces, electrical characteristics, optical characteristics, and thermal requirements of the multi-source agreement; and incorporating integrated framing within the multi-source agreement pluggable transceiver; wherein the incorporating step preserves the mechanical characteristics, management interfaces, electrical characteristics, optical characteristics, and thermal requirements of the multi-source agreement. Optionally, a further step is included of incorporating operations, administration, maintenance, & provisioning (OAM&P) functions necessary for metro, regional, and core applications within the multi-source agreement pluggable transceiver; wherein the incorporating OAM&P step preserves the mechanical characteristics, management interfaces, electrical characteristics, optical characteristics, and thermal requirements of the multi-source agreement. Alternatively, a further step is included of incorporating forward error correction for performance enhancement and reach extension within the multi-source agreement pluggable transceiver, the forward error correction is configured to correct errors in an optical signal; wherein the incorporating forward error correction step preserves the mechanical characteristics, management interfaces, electrical characteristics, optical characteristics, and thermal requirements of the multi-source agreement.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention integrates framing in MSA-compliant pluggable optical transceivers to extend the OTN framework into metro, regional, and core applications. Additionally, the present invention integrates FEC and optical layer OAM&P features in MSA-compliant pluggable optical transceivers. This integration is done with existing pluggable transceivers defined by MSAs such as, but not limited to, XFP, XPAK, XENPAK, X2, XFP-E, and SFP+. Further, the present invention can be extended to new, emerging pluggable transceiver standards and specifications. This invention provides for the integration of data encapsulation, framing, FEC, optical reach extension and optical layer OAM&P in a manner that preserves the MSA specifications. This allows systems designed for existing pluggable transceivers to realize carrier-grade, robust performance without additional equipment such as transponders and without redesigning host systems such as the line card to support new specifications.

In one exemplary embodiment of the present invention, G.709 framing with overhead for optical layer OAM&P and FEC is integrated into XFP, XPAK, XENPAK, X2, XFP-E, and SFP+ MSA specifications. This integration allows for on-chip OAM&P access through a subset of the G.709 overhead bytes or access to the entire G.709 overhead bytes in the pluggable transceiver. The OAM&P access is done through mechanisms fully compliant with the MSA specification. Additionally, G.709 FEC is added on the pluggable transceiver to extend optical reach, provide carrier-grade performance, and provide an additional layer of optical OAM&P through corrected error counts.

The present invention extends the benefits of pluggable transceivers beyond the current application space of short reach (less than 80 km) and interconnect applications to IP/Ethernet/ATM/Frame Relay/Fiber Channel over VWDM applications, high density applications, high performance FEC applications, G.709 interconnection applications, and applications requiring comprehensive optical layer OAM&P. As such, the present invention eliminates the need to add additional equipment to support these applications such as transponders or the need to redesign existing hardware by preserving existing MSA specifications.

Figure 1B:
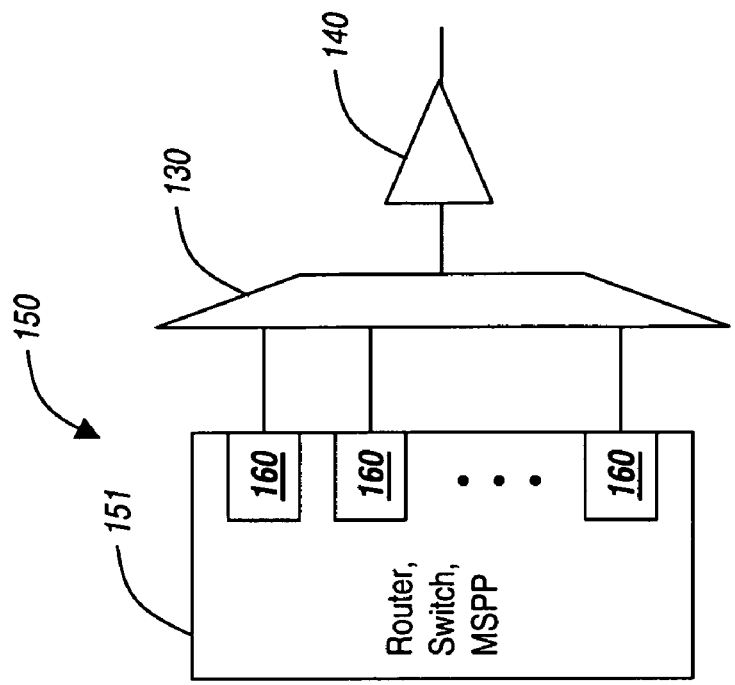
FIGS. 1a-1b are an illustration of pluggable transceivers of the prior art and of the present invention incorporated on devices for wavelength division multiplexed transmission.
Figure 1A:
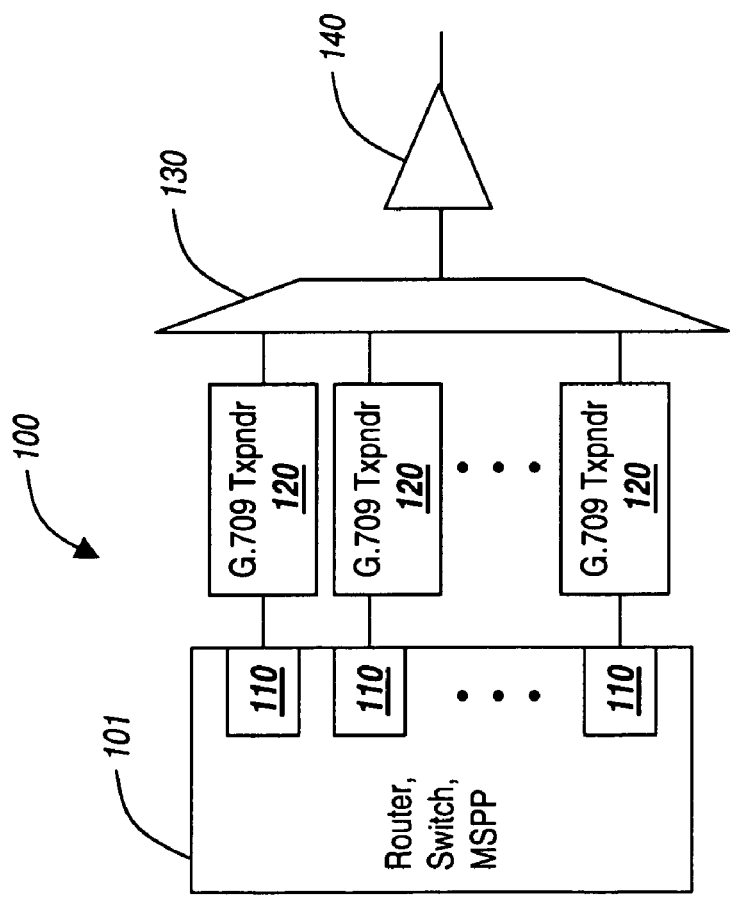

Referring to FIGS. 1a-1b, pluggable transceivers 110,160 can be included on devices 101,151 for wavelength division multiplexed (WDM) transmission into a multiplexer 130 and an amplifier 140. The devices 101,151 can include servers, routers, Ethernet switches, multi-service provisioning platforms (MSPPs), optical cross-connects, or any other device with requirements for optical transmission. The pluggable transceivers 110,160 are configured to plug into a line card, blade, or other device in the devices 101,151 to provide an optical signal for transmission. The pluggable transceivers 110,160 are designed to specifications such that they can be installed in any device 101,151 designed to host a pluggable transceiver 110,160. These specifications allow the design of the devices 101,151 to be de-coupled from the design of pluggable transceivers 110,160.

FIG. 1a illustrates the prior art with the device 101 equipped with pluggable transceivers 110 where the transceivers 110 are designed to support native optical line rates such as 9.96 Gbps for SONET OC-192 and SDH STM-64, 10.3 Gbps for GbE LAN PHY, and 10.5 Gbps for 10 G Fiber Channel. Further, the transceivers 110 do not support G.709 wrappers, FEC, and optical layer OAM&P integrated within the transceiver 110. The transceivers 110 are configured to accept an electrical signal and to convert it to an optical signal without additional functions such as adding G.709 overhead, processing G.709 management bytes, encoding FEC overhead, etc. As such, devices 101 equipped with transceivers 110 require transponders such as G.709 transponders 120 to offer G.709 wrappers, FEC, and OAM&P. The transceivers 110 typically provide optical reach up to 80 km with no transparency and optical layer OAM&P.

FIG. 1b illustrates an exemplary embodiment of the present invention with the device 151 equipped with pluggable transceivers 160 where the transceivers 160 include integrated G.709 wrapper, FEC, and OAM&P functionality. The transceivers 160 remove the need for external transponders to support G.709, FEC, and OAM&P by incorporating these functions internal to the transceiver 160 while maintaining the same interface to the device 151 as the transceiver 110 does with the device 101. This is done by adding the G.709 wrapper, FEC, and OAM&P within the specifications of the transceiver 110.

Transceivers 160 extend the OTN framework benefits for seamless interconnection applications and for OAM&P functions necessary for metro, regional, and core applications. Further, the transceivers 160 are configured to transparently transport asynchronous traffic such as IEEE 802.3 10 Gigabit Ethernet (10 GbE), 10 Gbps Fiber Channel traffic, or any 10 Gbps constant bit-rate (CBR) traffic seamlessly and efficiently across multiple networks using the OTN framework. This removes the need to sacrifice bandwidth utilization such as in SONET concatenation or the need to introduce another layer of adaptation such as generic framing procedure (GFP).

ITU-T Recommendation G.709 (Interface for the optical transport network (OTN)) is an example of a framing and data encapsulation technique. G.709 is a standardized method for managing optical wavelengths in an optical network. G.709 allows for transparency in wavelength services, improvement in optical link performance through out-of-band forward error correction (FEC), improved management through full transparency, and interoperability with other G.709 clients. G.709 defines a wrapper in which a client signal (e.g. OC-48, STM-16, OC-192, STM-64, 10 GbE, etc.) is encapsulated. The G.709 wrapper includes overhead bytes for optical layer OAM&P and FEC overhead for error correction. Traditionally, G.709 signals are used in a carrier-grade network to provide robust performance and OAM&P while transporting client signals with full transparency. Currently, MSA specifications such as XFP, XPAK, XENPAK, X2, XFP-E, and SFP+ do not address integration of G.709 within the pluggable transceiver.

Figure 2:
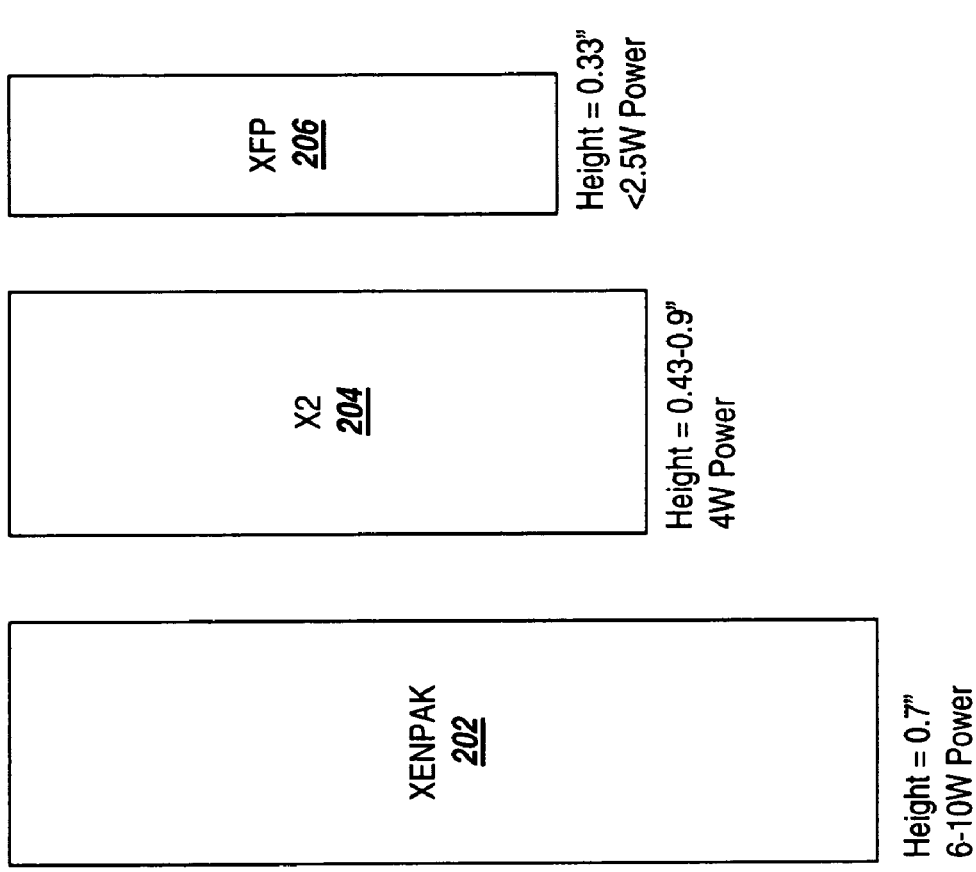
FIG. 2 illustrates several MSA specifications for pluggable optical transceivers such as XENPAK, X2, and XFP.

Referring to FIG. 2, several MSA specifications currently exist for pluggable optical transceivers including XENPAK 202, X2 204, and XFP 206. Power and space is limited in each of the specifications in FIG. 2. The pluggable MSAs were developed with intent to maximize port density; hence the power and foot-print constraints. The intent of the MSA specifications was to have framing, G.709, FEC, and OAM&P reside outside the pluggable transceiver. The XFP MSA, for example, states that the XFP transceiver must accept data input up to 11.1 Gbps FEC rate but not that the functions must be carried out inside the XFP due to the limited space and power available inside the XFP. However, these MSAs do not prevent the addition of additional functions such as G.709, FEC, and OAM&P internal to the pluggable transceiver. The present invention provides a system to integrate these functions while maintaining the MSA specifications through use of unused communication ports for OAM&P access and circuitry designed to fit within the space and power constraints of the MSA specification.

The XENPAK 202 MSA supports the proposed 802.3ae IEEE 10 Gigabit Ethernet (10 GbE) standard, and specifies a uniform form factor, size, connector type and electrical pinouts. XENPAK 202 simplifies management of architecture shifts and integration, minimizes system costs, ensures multiple vendors for market supply, and guarantees thermal performance for high density 10 GbE ports. XENPAK 202 requires power dissipation of no more than 6 W for 1310 nm and 850 nm wavelengths and power dissipation of no more than 10 W for 1550 nm wavelengths. The XENPAK 202 MSA is available at www.xenpak.org/MSA.asp and is hereby incorporated by reference.

The X2 204 MSA defines a small form-factor 10 Gbps pluggable fiber optic transceiver optimized for 802.3ae Ethernet, ANSI/ITUT OC192/STM-64 SONET/SDH interfaces, ITU-T G.709, OIF OC192 VSR, INCITS/ANSI 10GFC (10 Gigabit Fiber Channel) and other 10 Gigabit applications. X2 204 is physically smaller than XENPAK 202 but maintains the same electrical I/O specification defined by the XENPAK 202 MSA and continues to provide robust thermal performance and electromagnetic shielding. X2 204 uses the same 70-pin electrical connectors as XENPAK 202 supporting four wire XAUI (10-gigabit attachment unit interface). X2 204 supports an input signal of G.709, but does not support framing a non-G.709 signal internal to the pluggable transceiver and also does not support FEC and optical layer OAM&P. The X2 204 MSA is available at www.x2msa.org/MSA.asp and is hereby incorporate by reference.

The XFP (10 Gigabit Small Form Factor Pluggable) 206 is a hot-swappable, protocol independent optical transceiver, typically operating at 1310 nm or 1550 nm, for 10 Gigabit SONET/SDH, Fiber Channel, Gigabit Ethernet and other applications. The XFP 206 MSA is available from www.xfpmsa.org and is hereby incorporated by reference. The XFP 206 MSA defines a specification for a module, cage hardware, and IC interfaces for a 10 Gbps hot pluggable module converting serial electrical signals to external serial optical or electrical signals. The technology is intended to be flexible enough to support bit rates between 9.95 Gbps and 11.1 Gbps for services such as OC-192/STM-64, 10 G Fiber Channel, G.709, and 10 G Ethernet. XFP 206 supports native G.709 signals, but does not support the ability to frame a non-G.709 signal into a G.709 wrapper with FEC and OAM&P internal to the XFP 206 module. Currently, these features are done external to the XFP 206 module and a G.709 signal is sent to the XFP 206 module for optical transmission. XFP-E (not shown in FIG. 2) is an extension of the XFP 206 MSA for ultra-long haul DWDM applications and tunable optical transmitters.

XPAK (not shown in FIG. 2) is a reduced-size, pluggable 10 Gigabit Ethernet (GbE) module customized for enterprise, storage area network (SAN), and switching center market segment applications. The XPAK specifications define mechanical, thermal, and electromagnetic interference (EMI) mitigation features of the form factor, as well as reference 10-GbE optical and XENPAK 202 MSA electrical specifications. XPAK offers higher density and better power efficiency than XENPAK 202 and offers 10 GbE links up to 10 km and eventually 40 km.

The SFP+ (not shown in FIG. 2) MSA is a specification for a pluggable, hot-swappable optical interface for SONET/SDH, Fiber Channel, Gigabit Ethernet, and other applications. SFP+ is designed for up to 80 km reach and supports a full-range of applications including DWDM. SFP+ is similar in size and power with the XFP 206 specification, and similarly accepts a serial electrical input.

The XFP, XPAK, XENPAK, X2, XFP-E, and SFP+ MSAs all share similar design constraints in power and space. Some of these MSAs have been designed to accept G.709 framed signals (i.e. 10.7 Gbps and 11.1 Gbps), but the MSAs do not disclose integrated G.709 framing, optical layer OAM&P, and FEC internal to the pluggable transceivers. MSAs define input signal interfaces, mechanical, thermal, and software management interfaces. The present invention introduces G.709 framing, OAM&P, and FEC without changing any of the MSA interfaces or mechanical characteristics.

Figure 3A:
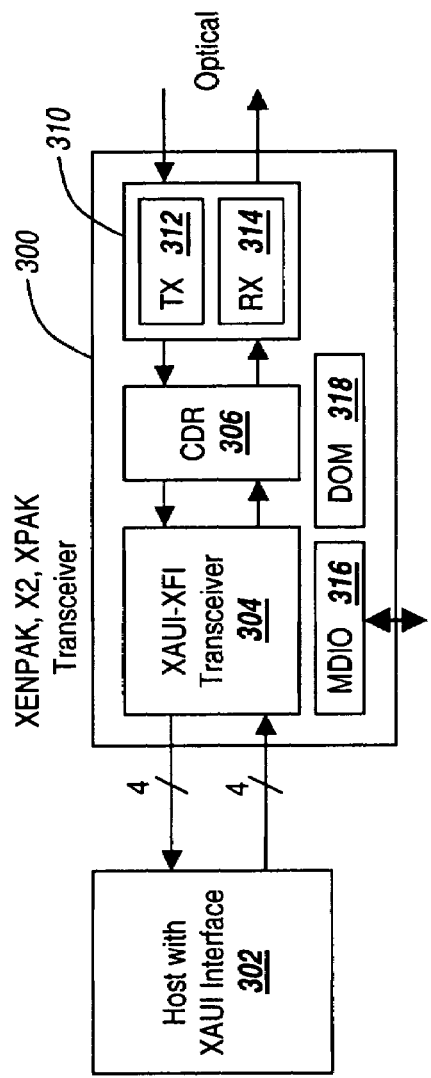
FIGS. 3a-3b illustrate functional block diagrams of XENPAK, XPAK, X2, and XFP pluggable optical transceivers.
Figure 3B:
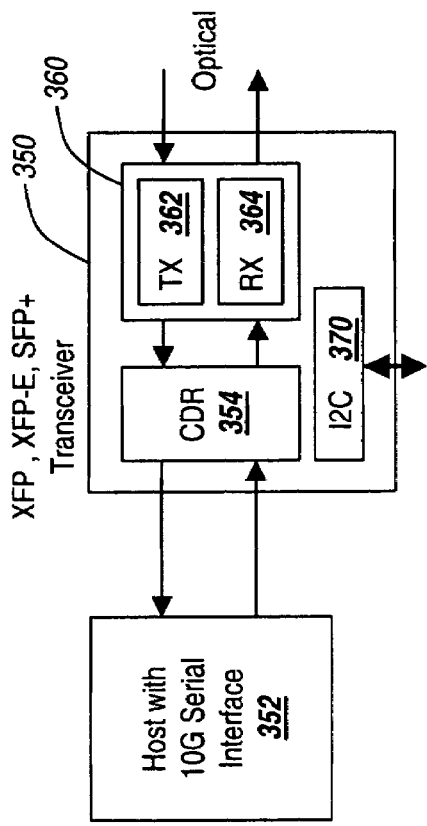

Referring to FIGS. 3a-3b, existing pluggable transceivers do not include circuitry for data encapsulation, integrated G.709 framing, OAM&P, and FEC. FIG. 3a illustrates a functional block diagram of a XENPAK, XPAK, and X2 pluggable transceiver 300, and FIG. 3b illustrates a functional block diagram of an XFP, XFP-E, and SFP+ pluggable transceiver 350.

In FIG. 3a, the XENPAK, XPAK, and X2 pluggable transceiver 300 includes an optical module 310 connected to a clock and data recovery (CDR) 306 module which is connected to a XAUI-XFI transceiver 304. The XAUI-XFI transceiver 304 is configured to connect to a host device with an XAUI interface 302. The host device includes a socket in which the pluggable transceiver 300 plugs into to connect to the host 302. XAUI is a 4×3.125 Gbps electrical connection compliant with the IEEE 802.3ae 10 GbE specification. XFI is a standard interface for connecting 10 Gig Ethernet MAC devices to an optical interface. The XAUI-XFI transceiver 304 includes multiplexer/demultiplexer functions and encoding/decoding functions to perform 8B/10B and 64B/66B coding. XAUI provides four lanes running at 3.125 Gbps using 8B/10B encoding and XFI provides a single lane running at 10.3125 Gbps using 64B/66B encoding.

The XAUI-XFI transceiver 304 accepts the XAUI signal and converts it into a serial connection such as a 10.3125 Gbps XFI signal for transmission by the optical module 310. The optical module 310 includes a transmitter (TX) 312 and a receiver (RX) 314. The TX/RX 312,314 can include 850 nm, 1310 nm, 1550 nm, DWDM, CWDM, and gray wavelengths depending on the application requirements. The TX/RX 312,314 connect to the CDR 306 module where a clock is generated by retrieving the phase information of an input signal and retiming occurs on an output signal. In some embodiments, the functionality of the CDR 306 is included in the XAUI-XFI transceiver 304. While the pluggable transceiver 300 provides functionality to convert between XAUI and XFI, the transceiver 300 does not include integrated G.709 framing, optical layer OAM&P, and FEC functionality.

Additionally, the pluggable transceiver 300 includes management data input/output (MDIO) 316 and digital optical monitoring (DOM) 318 for communications and performance monitoring between the transceiver 300 and the host 302. MDIO 316 is a standard-driven, dedicated-bus approach that is specified by IEEE workgroup 802.3. The MDIO 316 interface is implemented by two pins, an MDIO pin and a Management Data Clock (MDC) pin. The MDIO 316 interface is defined in relationship to the accessing and modification of various registers within physical-layer (PHY) devices, and how they relate to connecting to media access controllers (MACs) in 1- and 10-Gbit/s Ethernet solutions. One MDIO 316 interface can access up to 32 registers, in 32 different devices. A device driving an MDIO 316 bus is called a station management entity (STA), and the device being managed by the STA is called the MDIO Manageable Device (MMD). The STA drives the MDC line. It initiates a command using an MDIO frame and provides the target register address. During a write command, the STA also provides the data. In the case of a read command, the MMD takes over the bus and supplies the STA with the data. DOM 318 is an optical monitoring scheme utilized by each MSA specification for performance monitoring on the pluggable transceiver. For example, the DOM 318 can provide performance monitoring data such as optical output power, optical input power, laser bias current, etc. While DOM 318 provides some performance monitoring capabilities, it does not provide optical layer OAM&P capable of operating carrier-grade networks. DOM 318 provides component level performance monitoring information and DOM 318 does not provide optical link layer OAM&P.

In FIG. 3b, the XFP, XFP-E, and SFP+ pluggable transceiver 350 includes a clock and data recovery (CDR) 354 module configured to accept a serial input from a host with a 10 G serial interface 352. The CDR 354 module generates a clock by retrieving the phase information of an input signal and retiming occurs on an output signal. The CDR 354 module connects to an optical module 360 which includes a transmitter (TX) 362 and a receiver (RX) 364. The TX/RX 362, 364 can include 850 nm, 1310 nm, 1550 nm, DWDM, CWDM, and gray wavelengths depending on the application requirements. Additionally, the pluggable transceiver 350 includes an inter-integrated circuit (I2C) 370 serial bus. I2C is a serial communications bus through which a pluggable transceiver 350, such as XFP, XFP-E, and SFP+, communicates to the host system. The pluggable transceiver 350 provides no multiplexer/demultiplexer or encoding/decoding functionality and solely provides an electrical to optical conversion of a signal. Similar to the XENPAK, XPAK, and X2 pluggable transceiver 300, the XFP, XFP-E, and SFP+ pluggable transceiver 350 provides no G.709 framing, OAM&P, and FEC functionality. In contrast to the XENPAK, XPAK, and X2 transceiver 300, the XFP, XFP-E, and SFP+ transceiver 350 utilizes less space and power.

Figure 4A:
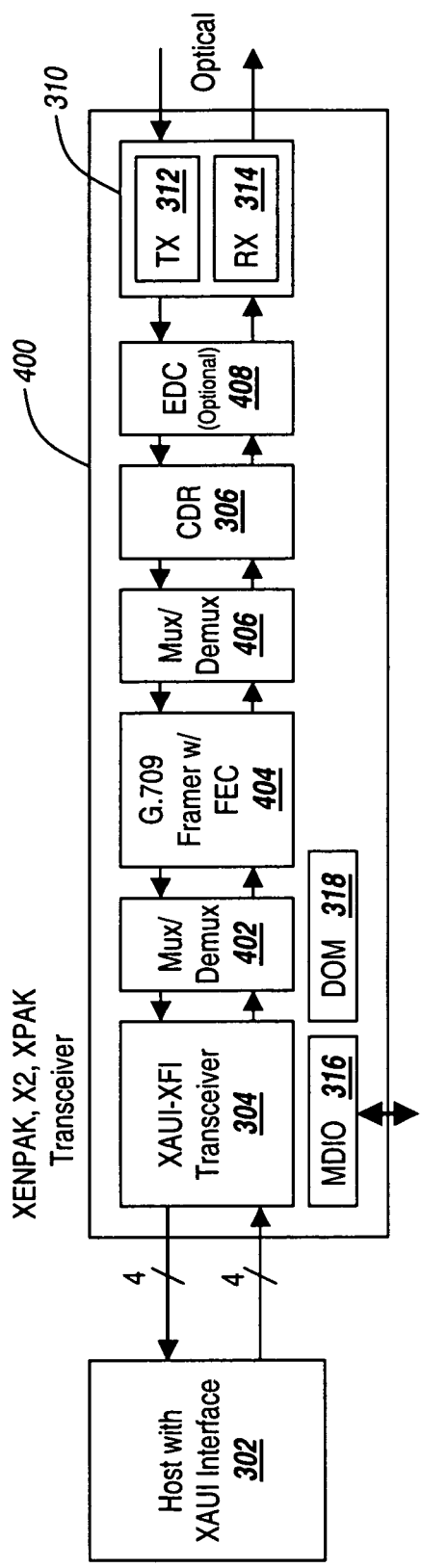
FIG. 4 is an exemplary block diagram of a pluggable transceiver of the present invention for the XPAK, XENPAK, and X2 MSAs.
Figure 4B:
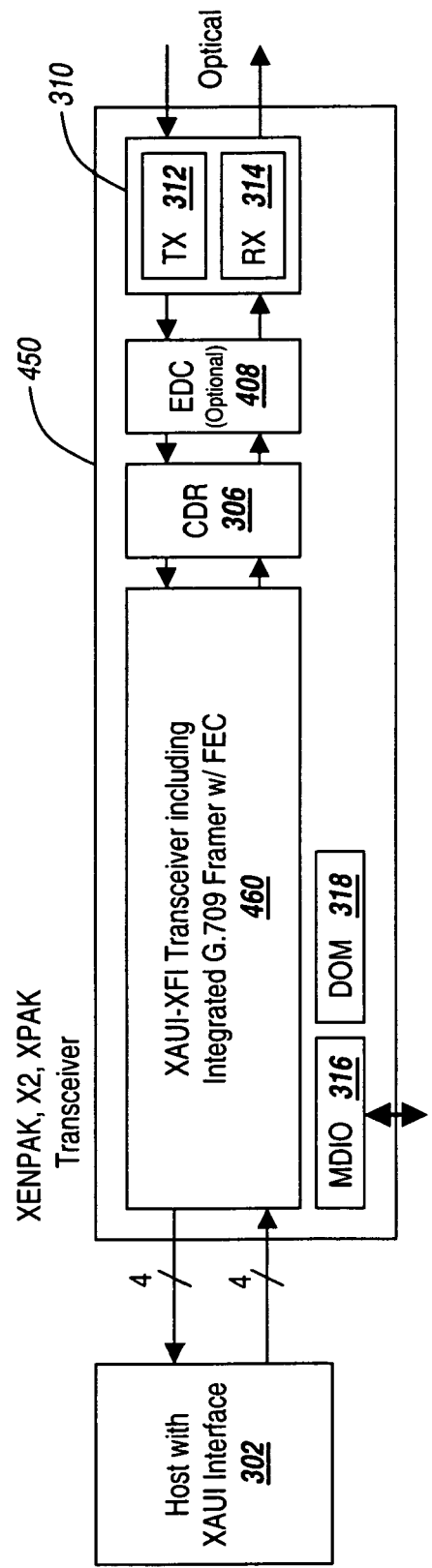

Referring to FIGS. 4a-4b, in one exemplary embodiment of the present invention, XENPAK, X2, and XPAK pluggable transceivers 400,450 include integrated circuitry to perform G.709 framing, optical layer OAM&P, and FEC internal to the pluggable transceiver 400,450 while preserving the power, space, and communication specifications of the XENPAK, X2, and XPAK MSAs. FIG. 4a illustrates a pluggable transceiver 400 with G.709 framing circuitry external to a XAUI-XFI transceiver 304. FIG. 4b illustrates a pluggable transceiver 450 with G.709 framing circuitry integrated within a XAUI-XFI transceiver 460. Optionally, both pluggable transceivers 400,450 can also include an electrical dispersion compensation 408 module.

In FIG. 4a, the pluggable transceiver 400 includes the same functionality as the pluggable transceiver 300 in FIG. 3a with a XAUI-XFI transceiver 304, a CDR 306 module, an optical module 310, MDIO 316, and DOM 318. Additionally, the pluggable transceiver 400 includes a G.709 framer with FEC 404 which is configured to frame an input signal to the transceiver 400 with a G.709 compliant frame. Further, the G.709 framer 404 is configured to provide optical layer OAM&P on the G.709 frame and to provide FEC through the G.709 frame.

The pluggable transceiver 400 includes two multiplexers/de-multiplexers 402,406 connected to the G.709 framer with FEC 404. The input and output from the XAUI-XFI transceiver 304 is a 10 Gbps XFI signal. The multiplexer/demultiplexer 402 is configured to adapt the input and output from the XAUI-XFI transceiver 304 to an appropriate rate for the G.709 framer with FEC 404 to operate on the signal to perform framing, OAM&P, and FEC. The input and output to the CDR 306 is a 10 Gbps XFI signal. The multiplexer/demultiplexer 406 is configured to adapt the input and output from the G.709 framer with FEC 404 back to the XFI rate for input and output to the CDR 306.

In the exemplary embodiment of FIG. 4, the G.709 framer with FEC 404 is configured to accept an unframed signal such as a 10 GbE or 10 G FC signal from the XAUI-XFI transceiver 304 and to pass a G.709 framed signal to the CDR 306. The G.709 framer with FEC 404 includes integrated circuitry to add a G.709 frame to the unframed signal including G.709 OAM&P and FEC and to pass the framed signal to the CDR 306. Further, the G.709 framer with FEC 404 includes integrated circuitry to remove a G.709 frame including processing the G.709 OAM&P and FEC and to pass the unframed signal to the XAUI-XFI transceiver 304. The G.709 frame includes overhead bytes for OAM&P and FEC data.

The G.709 framer with FEC 404 is configured to pass overhead to the host 302 either through the MDIO 316 or through a direct connection. Using the MDIO 316, the pluggable transceiver 400 utilizes unused MDIO 316 registers to communicate overhead data in a manner fully supported by the MSA specifications. For example, the XENPAK, XPAK, and X2 MSAs include unused registers which can be used to implement advanced features such as passing management overhead externally from the pluggable transceiver 400. These registers can be used both for passing G.709 OAM&P and FEC information when the overhead is terminated on the transceiver 400. In the case of terminating the overhead on the transceiver 400, a subset of G.709 overhead is terminated due to limitations in the MDIO 316 access. The present invention provides a subset of G.709 OAM&P to comply with the communication requirements in the MSAs. Additionally, the G.709 framer with FEC 404 can be configured to pass the entire G.709 overhead to the host 302 through a direct connection.

The G.709 framer with FEC 404 is an integrated circuit such as a custom built application specific integrated circuit (ASIC). The design of G.709 framer with FEC 404 is such to minimize power dissipation and each device is designed for less than 1.5 W of power consumption to ensure the pluggable transceiver 400 meets or exceeds the XPAK, XENPAK, and X2 MSA specifications.

Additionally, the G.709 framer with FEC 404 is configured to add/remove and process FEC overhead on an optical signal. The addition of FEC in the pluggable transceiver 400 provides an additional 6 to 9 dB of coding gain that can provide improved link budgets, higher system margins for robust connections, relaxed specifications on the optical components, real time monitoring of the link health status and historical BER data, and real-time monitoring of link degradation without affecting the quality of the link. In one exemplary embodiment, the FEC is Reed-Solomon (255, 239) code as defined in G.709 and is capable of correcting eight symbol errors per block. Additionally, the present invention can be modified by one skilled in the art to enable other framing and FEC techniques on pluggable transceivers 400.

In FIG. 4*b*, the pluggable transceiver 450 includes the same functionality as the pluggable transceiver 300 in FIG. 3*a* with a XAUI-XFI transceiver including an integrated G.709 framer with FEC 460, a CDR 306 module, an optical module 310, MDIO 316, and DOM 318. The pluggable transceiver 450 includes G.709 framing, OAM&P, and FEC within the XAUI-XFI transceiver 460. The XAUI-XFI transceiver 460 includes the same functionality as the components 304,402, 404,406 in FIG. 4*a* in a single module. For example, the XAUI-XFI transceiver 460 can include a single ASIC combining the XAUI-XFI transceiver functionality with multiplexer/de-multiplexer, G.709 framing, OAM&P, and FEC functionality. Additionally, the XAUI-XFI transceiver 460 can include the CDR 406 functionality, removing the need for a separate module.

Optionally, the pluggable transceivers 400,450 can include an electronic dispersion compensating (EDC) 408 circuit configured to electronically compensate for the optical fiber chromatic and/or polarization mode dispersion on the TX 312 and RX 314. The EDC 408 circuit removes the requirement to include dispersion compensating elements such as dispersion compensating fiber (DCF) in-line with the pluggable transceivers 400,450. Such DCF modules increase system cost and reduce system performance. Additionally, the EDC 408 can include the functionality of the CDR 306, removing the need to have a separate CDR 306 circuit.

Figure 5:
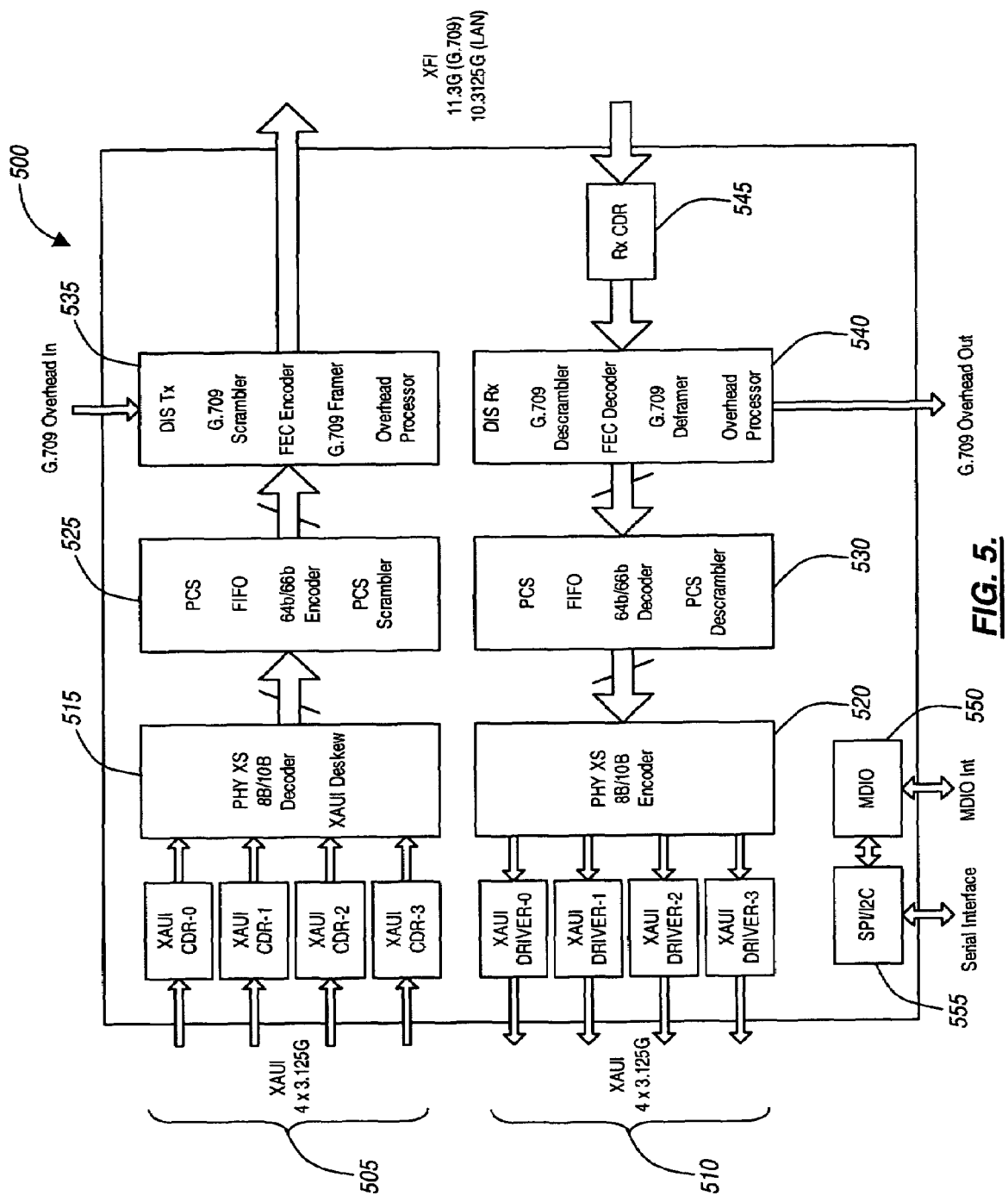
FIG. 5 is an exemplary block diagram of an XAUI-XFI transceiver including an integrated G.709 framer with FEC of the present invention.

Referring to FIG. 5, an exemplary embodiment of a XAUI-XFI transceiver 500 including integrated G.709 framing and FEC includes integrated circuitry to multiplex/de-multiplex, encode/decode, frame/un-frame, and process overhead and FEC. XAUI clock and data recover (CDR) 505 inputs are configured to accept four 3.125 Gbps signals from a host system, to retime, recover the clock, and pass the four 3.125 Gbps signals to a PHY XS 8B/10B decoder 515. The decoder 515 is configured to de-multiplex four XAUI signals running at 3.125 Gbps using 8B/10B encoding and pass the output to a physical coding sub-layer (PCS) 525 module. The PCS 525 module performs 64B/66B encoding to provide a single lane XFI signal running at 10.3125 Gbps and PCS scrambling. The PCS 525 module outputs to a G.709 framer 535.

The G.709 framer 535 accepts an output from the PCS 525 module and de-multiplexes it to an appropriate rate for the G.709 framer 535 to operate on the signal. The G.709 framer 535 is configured to provide G.709 framing, G.709 scrambling, FEC encoding, and G.709 overhead processing. The G.709 framer 535 is configured to communicate with the MDIO 550 utilizing unused registers to communicate overhead to the host system or to communicate through a direct connection to receive G.709 overhead from the host system. Further, the G.709 framer 535 multiplexes the framed signal to input the signal to an optical transmitter off the transceiver 500.

A receiver (RX) clock and data recovery circuit 545 is configured to accept an input from an optical receiver external to the transceiver 500 and to retime, recover the clock, and pass the inputted signal to a G.709 de-framer 540. The G.709 de-framer 540 de-multiplexes the signal to an appropriate rate for the G.709 de-framer 540 to operate on the signal. The G.709 de-framer 540 is configured to provide G.709 de-framing, G.709 de-scrambling, FEC decoding, and G.709 overhead processing. The G.709 de-framer 540 is configured to communicate with the MDIO 550 utilizing unused registers to communicate overhead to the host system or to communicate through a direct connection to pass G.709 overhead to the host system. Further, the G.709 de-framer 540 provides an unframed signal to a PCS 530 module.

The PCS 530 module performs 64B/66B decoding and PCS de-scrambling. The PCS 530 module outputs to a PHY XS 8B/10B encoder 520. The encode 520 is configured to de-multiplex an XFI signal into four XAUI signals running at 3.125 Gbps using 8B/10B encoding and pass the output to four XAUI drivers 510. The XAUI drivers 510 provide four 3.125 Gbps signals to the host system. Additionally, the XAUI-XFI transceiver 500 includes a serial packet interface (SPI) and I2C interface 555 for communications to the host system. The MDIO 550 interface is utilized to provide standard MSA-compliant communications to the host system. Additionally, the present invention utilizes the MDIO 550 to communicate a subset of OAM&P and FEC overhead to the host system from the G.709 framer 535 and G.709 de-framer 540 through unused MDIO registers.

Figure 6:
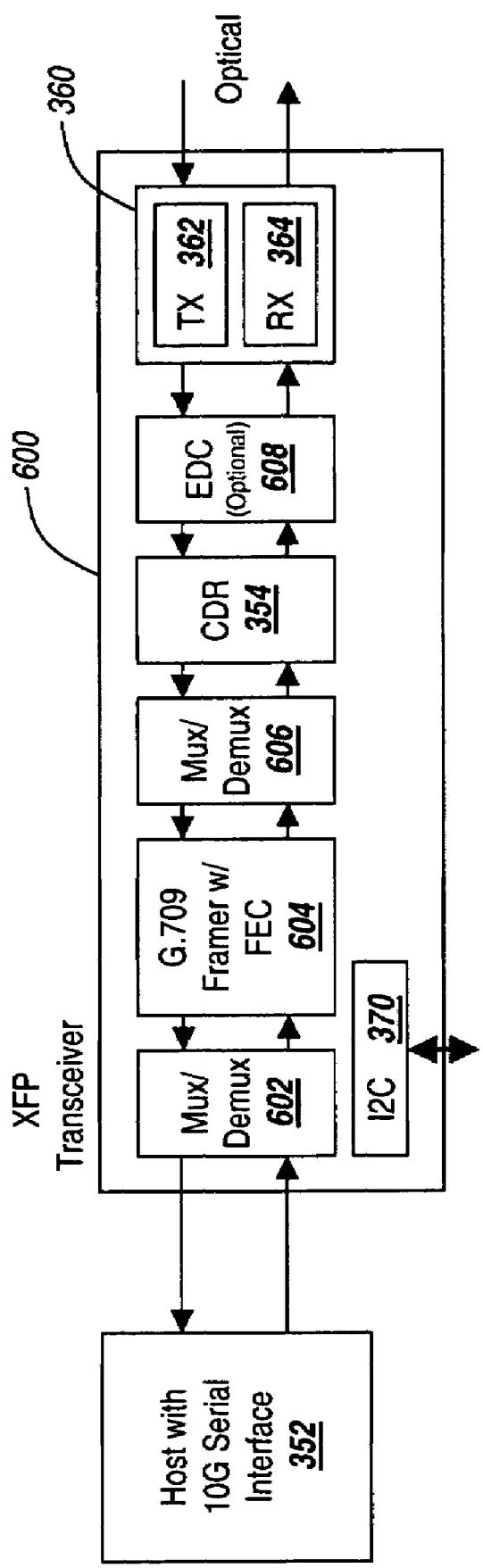
FIG. 6 is an exemplary block diagram of a pluggable transceiver of the present invention for the XFP, XFP-E, and SFP+ MSAs.

Referring to FIG. 6, in another exemplary embodiment of the present invention, a pluggable transceiver 600 for the XFP, XFP-E, and SFP+ MSAs includes a G.709 framer with FEC 604 integrated within the transceiver 600. The pluggable transceiver 600 includes the same functionality as the pluggable transceiver 350 in FIG. 3*b* with a CDR 354 module, an optical module 360, and an I2C 670. Additionally, the pluggable transceiver 600 includes a G.709 framer with FEC 604 which is configured to frame an input signal to the transceiver 600 with a G.709 compliant frame. Further, the G.709 framer 604 is configured to provide optical layer OAM&P on the G.709 frame and to provide FEC through the G.709 frame.

The pluggable transceiver 600 includes two multiplexers/de-multiplexers 602,606 connected to the G.709 framer with FEC 604. The input and output from the CDR 354 is a 10 Gbps serial signal. The multiplexer/de-multiplexer 602 is configured to adapt the input and output from a host with a 10 Gbps serial interface 352 to an appropriate rate for the G.709 framer with FEC 604 to operate on the signal to perform framing, OAM&P, and FEC. The input and output to the CDR 354 is a 10 Gbps serial signal. The multiplexer/de-multiplexer 606 is configured to adapt the input and output from the G.709 framer with FEC 604 back to the 10 Gbps rate for input and output from the CDR 354.

In the exemplary embodiment of FIG. 6, the G.709 framer with FEC 604 is configured to accept an unframed signal such as a 10 GbE or 10G FC signal or a framed signal such as an OC-192 or STM-64 from the host 352 and to pass a G.709 framed signal to the CDR 354. The G.709 framer with FEC 604 includes integrated circuitry to add a G.709 frame to the unframed signal including G.709 OAM&P and FEC and to pass the framed signal to the CDR 406. Further, the G.709 framer with FEC 604 includes integrated circuitry to remove a G.709 frame including processing the G.709 OAM&P and FEC and to pass the unframed signal to the host 352. The G.709 frame includes overhead bytes for OAM&P and FEC data.

The G.709 framer with FEC 604 is configured to pass overhead to the host 352 either through the I2C 370 or through a direct connection. Using the I2C 37-, the pluggable transceiver 600 communicates overhead data in a manner fully supported by the MSA specifications. In the case of terminating the overhead on the transceiver 600, a subset of G.709 overhead is terminated due to limitations in the I2C 370 access. The present invention provides a subset of G.709 OAM&P to comply with the communication requirements in the MSAs. Additionally, the G.709 framer with FEC 604 can be configured to pass the entire G.709 overhead to the host 352 through a direct connection.

The G.709 framer with FEC 604 is an integrated circuit such as a custom built application specific integrated circuit (ASIC). The design of G.709 framer with FEC 604 is such to minimize power dissipation and each device is designed for less than 1.5 W of power consumption to ensure the pluggable transceiver 600 meets or exceeds the XFP, XFP-E, and SFP+ MSA specifications. Further, the functionality of the multiplexer/de-multiplexer 602,606 and the CDR 354 can be integrated within the G.709 framer with FEC 604 in a single ASIC.

Additionally, the G.709 framer with FEC 604 is configured to add/remove and process FEC overhead on an optical signal. The addition of FEC in the pluggable transceiver 600 provides an additional 6 to 9 dB of coding gain that can provide improved link budgets, higher system margins for robust connections, relaxed specifications on the optical components, real time monitoring of the link health status and historical BER data, and real-time monitoring of link degradation without affecting the quality of the link. In one exemplary embodiment, the FEC is Reed-Solomon (255, 239) code as defined in G.709 and is capable of correcting eight symbol errors per block. Additionally, the present invention can be modified by one skilled in the art to enable other framing and FEC techniques on pluggable transceivers 600.

Optionally, the pluggable transceiver 600 can include an electronic dispersion compensating (EDC) 608 circuit configured to electronically compensate for the optical fiber chromatic and/or polarization mode dispersion on the TX 362 and RX 364. The EDC 608 circuit removes the requirement to include dispersion compensating elements such as dispersion compensating fiber (DCF) in-line with the pluggable transceiver 600. Such DCF modules increase system cost and reduce system performance. Additionally, the EDC 608 can include the functionality of the CDR 354, removing the need to have a separate CDR 354 circuit.

The G.709 framer with FEC 404,604 and XAUI-XFI transceiver including integrated G.709 framer with FEC 460 in FIGS. 4a, 4b, and 6 can be added to any pluggable transceiver. These include currently defined MSAs such as XENPAK, X2, XPAK, XFP, XFP-E, and SFP+ as well as new and emerging specifications which do not incorporate framing integrated with the pluggable transceiver.

Figure 7:
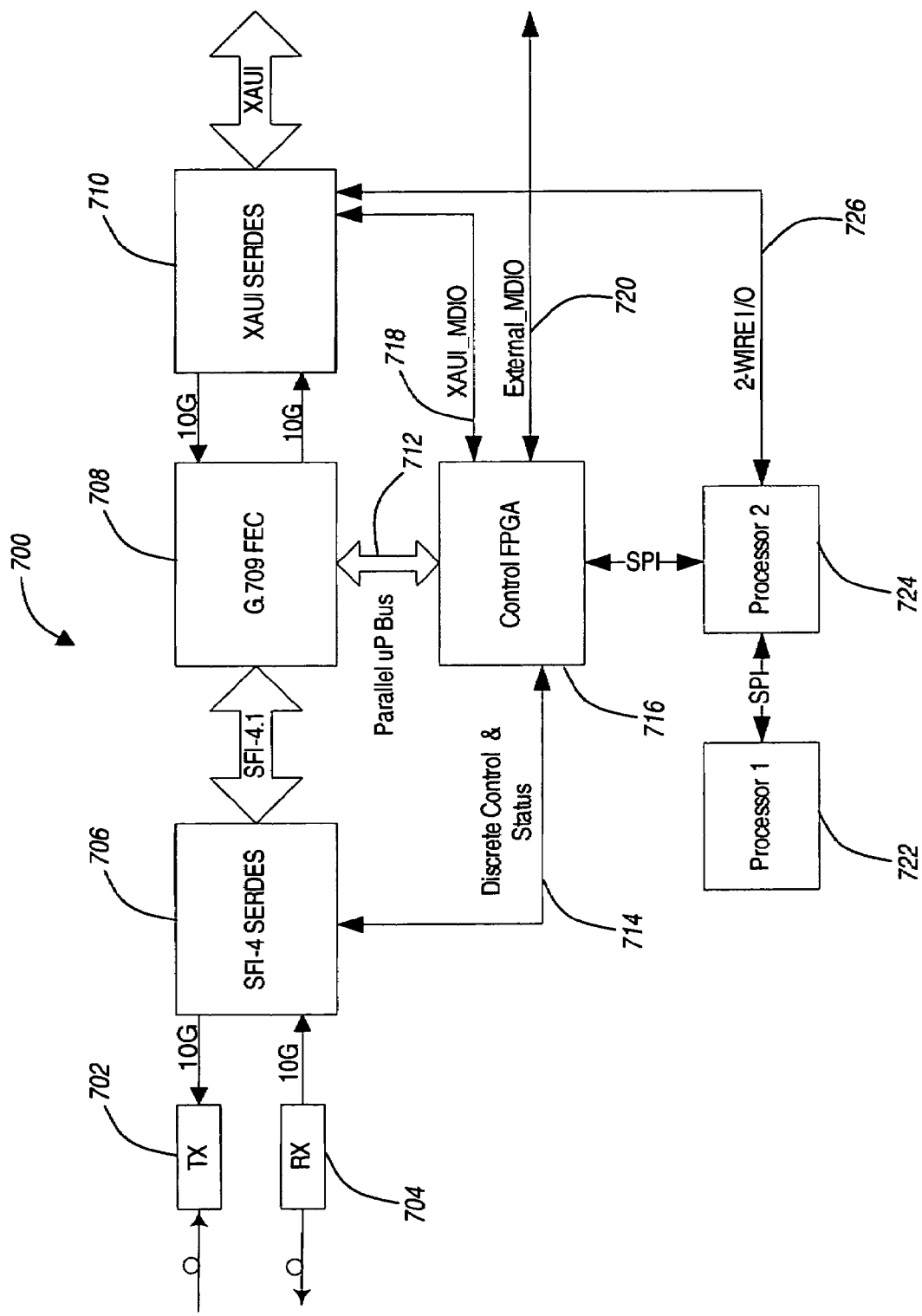
FIG. 7 is an exemplary embodiment of a pluggable transceiver of the present invention with an MDIO bridge for communicating to the MDIO from a G.709 framer with FEC and from a XAUI serializer/de-serializer (SerDes).

Referring to FIG. 7, an exemplary embodiment of a pluggable transceiver 700 with an MDIO bridge provides a mechanism in the present invention to communicate to the MDIO from a G.709 framer with FEC 708 and from a XAUI serializer/de-serializer (SerDes) 710. The MDIO bridge preserves the standard MDIO functionality found in MSA specifications such as XENPAK, XPAK, and X2 and allows the G.709 framer with FEC 708 to communicate utilizing the same MDIO. As such, a host system configured to communicate with a pluggable transceiver can operate with a pluggable transceiver 700 with an integrated G.709 framer. The host system can be modified in software only to receive MDIO communications from the MDIO bridge.

The pluggable transceiver 700 includes a transmitter (TX) 702 and a receiver (RX) 704 connected at 10 Gbps to an SFI-4 SerDes 706. SFI-4 is SerDes Framer Interface standard level 4 from the Optical Internetworking Forum (OIF). SIF-4 is one example of an interface to the G.709 framer 708. Other interfaces to the G.709 frame can include XGMII, XFI, and XAUI. The SFI-4 SerDes 706 connects to the G.709 framer 708 with an SFI 4.1 signal. The G.709 framer 708 connects at 10 Gbps to the XAUI SerDes 710 which in turn connects to a host device.

The MDIO bridge includes a control field programmable gate array (FPGA) 716 which is configured to bridge the MDIO interface between the G.709 framer 708 and the XAUI SerDes 710. The FPGA 716 connects to the G.709 framer 708 and to the XAUI SerDes 710 and provides a single external MDIO 720 interface to the host device. This external MDIO interface 720 includes data from both the XAUI SerDes 710 and the G.709 framer 708. The FPGA 716 connects to the XAUI SerDes 710 through a XAUI MDIO 718 connection and to the G.709 framer 708 through a parallel microprocessor bus 712. Additionally, the FPGA 716 provides discrete control and status 714 to the SFI-4 SerDes 706. The FPGA 716 has a serial packet interface (SPI) to a processor 724 which in turn has a 2-wire input/output (I/O) connection 726 to the XAUI SerDes 710 and a SPI interface to another processor 722.

The FPGA 716 is configured to decode MDIO addresses and pass MDIO data between both the G.709 framer 708 and the XAUI SerDes 710. Also, the FPGA 716 is configured to combine MDIO data from both the G.709 framer 708 and the XAUI SerDes 710 to the external MDIO 720. As such, the MDIO bridge provides a mechanism for a single, MSA-compliant MDIO interface to operate with the additional circuitry of the G.709 framer with FEC 708.

Figure 8:
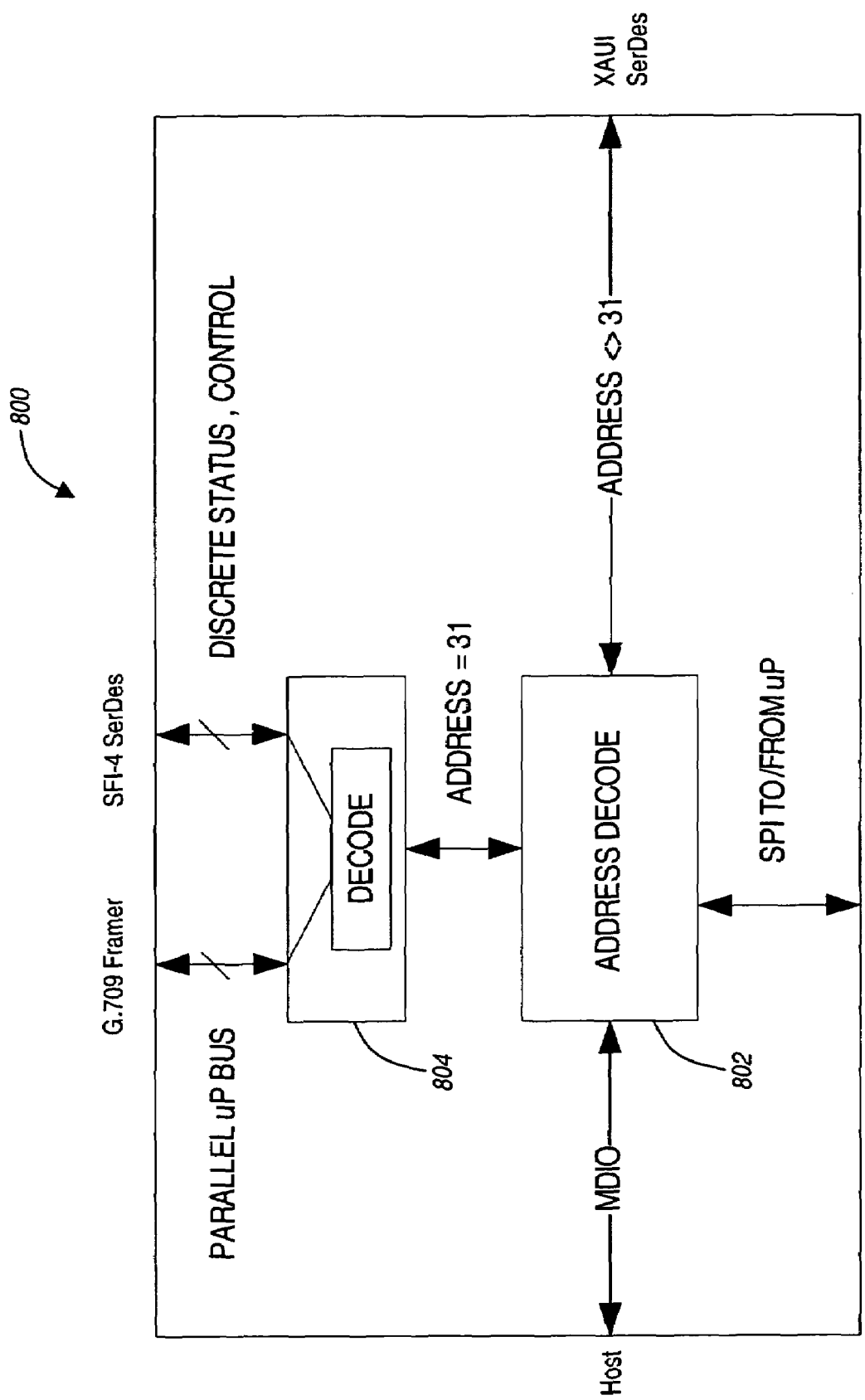
FIG. 8 illustrates an MDIO bridge for performing an address decode to split MDIO data between the G.709 framer and the XAUI SerDes.

Referring to FIG. 8, the MDIO bridge performs an address decode 802 to split MDIO data between the G.709 framer and the XAUI SerDes. The address decode 802 receives/transmits MDIO data to/from the host device and checks the MDIO address. If the MDIO is a specific address, then the address decode sends it to decode 804. If not, then the address decode 802 sends it to the XAUI SerDes. For example, if the MDIO address is 31, then the address is sent to decode 804. If the address is not 31, then it sends the data to the XAUI SerDes. The address corresponds to the register in the MDIO, and register 31 can be undefined in some of the MSA specifications allowing register 31 to be used to pass overhead between the G.709 framer and the host system. Any other register in the MDIO which is undefined can be used to pass overhead. The decode 804 determines whether the data with address 31 should go to the parallel microprocessor bus to the G.709 framer or to the SFI-4 SerDes for discrete status and control.

Figure 9:
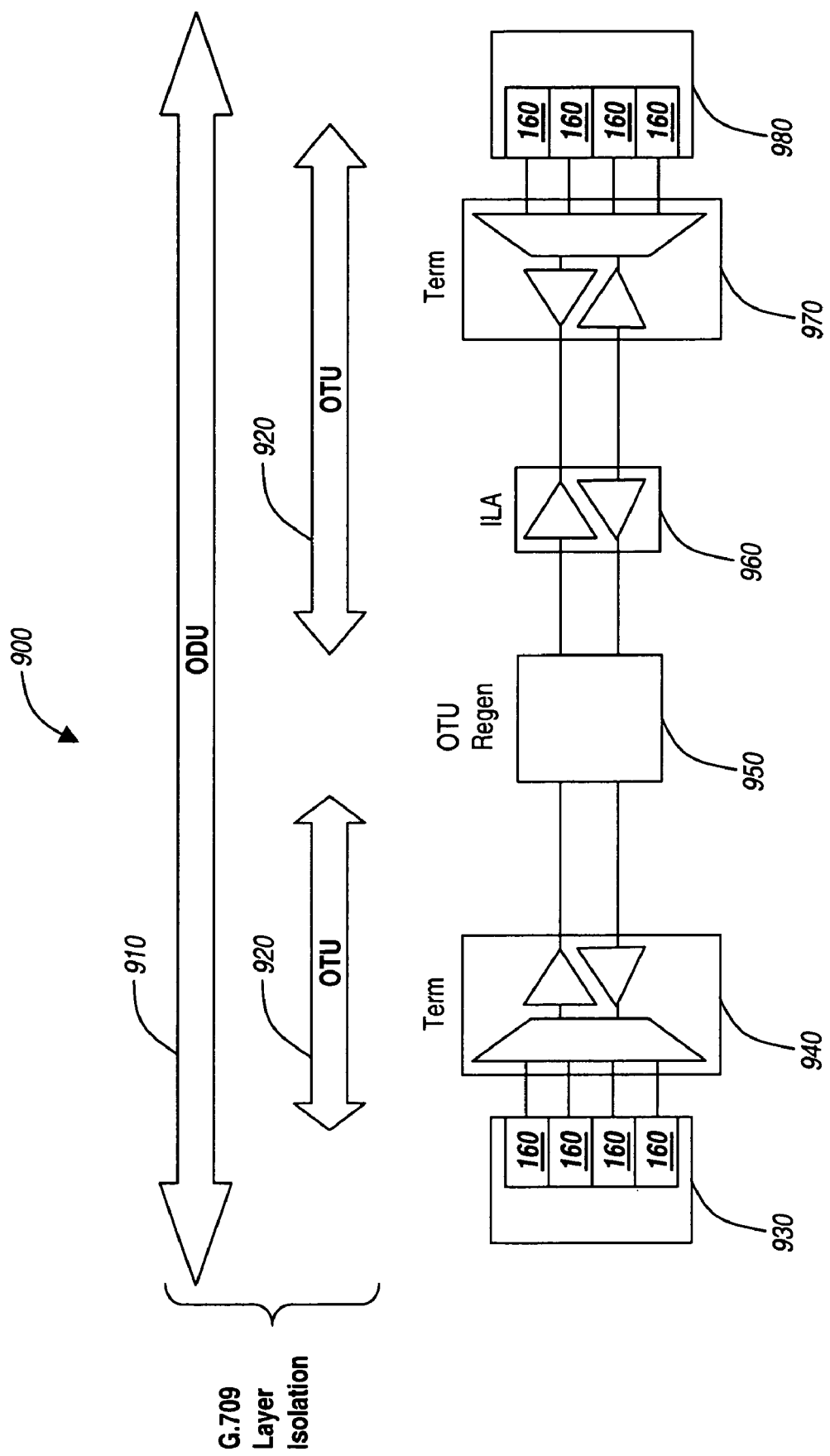
FIG. 9 is an illustration of the optical layers in G.709.

Referring to FIG. 9, ITU-T Recommendation G.709 defines a layered approach to management and monitoring of sections in an optical network 900. G.709 provides for transparency in wavelength services, improvement in optical link performance through out-of-band forward error correction (FEC), improved management through full transparency, and interoperability with other G.709 clients. G.709 defines a wrapper in which a client signal is encapsulated. The G.709 wrapper includes overhead bytes for optical layer OAM&P and FEC overhead for error correction.

The optical network 900 includes client devices 930,980 each equipped with one or more pluggable transceivers 160 of the present invention. The pluggable transceivers 160 of the client device 930 are connected to an optical terminal 940, an optical transport unit (OTU) regen 950, an in-line line amplifier (ILA) 960, and a second optical terminal 970 which is connected to the pluggable transceivers 160 of the second client device 980. The optical channel data unit (ODU) 910 layer is between optical client elements. In the example of FIG. 9, the ODU 910 layer is between each pluggable transceiver 160 of the first client device 930 and each pluggable transceiver 160 of the second client device 980. The ODU 910 layer is similar to the line layer in the SONET standard. The optical transport unit (OTU) 920 is between the OTU regen 950 and each of the pluggable transceivers 160 of the client devices 930,980 similar to the SONET section layer.

In an exemplary embodiment of the present invention, G.709 framing is integrated into pluggable transceivers specified by MSAs such as XFP, XPAK, XENPAK, X2, XFP-E, and SFP+. The G.709 framing in the pluggable transceivers provides the ability to monitor OAM&P associated with the G.709 ODU 910 and OTU 920 layers to enable optical layer OAM&P functions necessary for metro, regional and core applications direct from pluggable transceivers. The monitoring of the ODU 910 and OTU 920 layers allows isolation of OAM&P and error monitoring between optical sections of the pluggable transceivers. Further, the pluggable transceivers are capable of being monitored by industry-compliant network management systems (NMS) such as CORBA and TL-1. The pluggable transceivers of the present invention can support any framing method capable of OAM&P at the optical layer in addition to G.709.

Figure 10B:
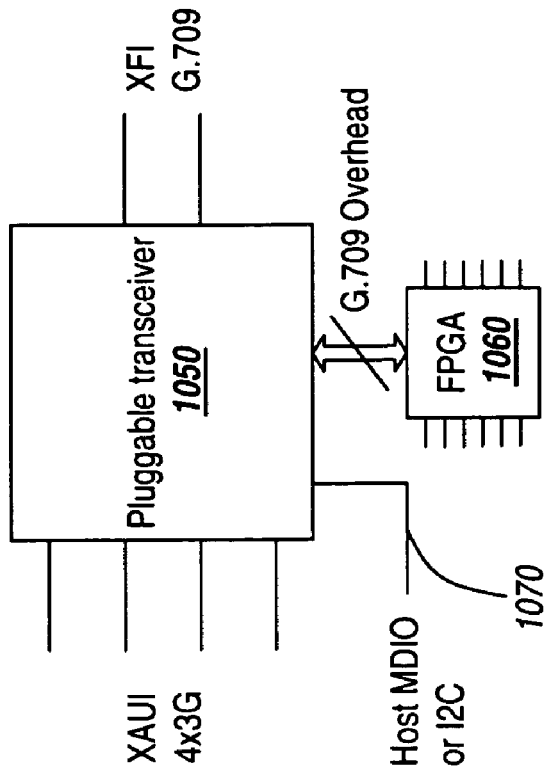
FIGS. 10a-10b illustrate exemplary mechanisms of the present invention for terminating frame overhead management data internally in a pluggable transceiver or for passing the frame overhead management data to a host system.
Figure 10A:
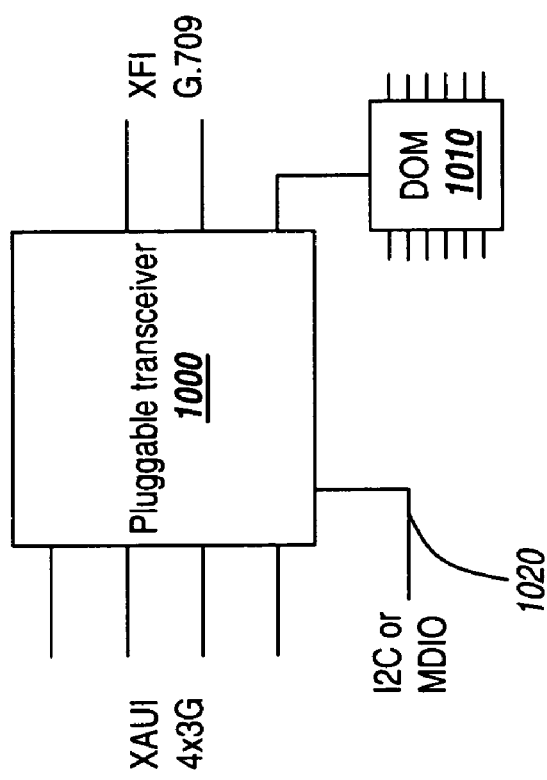

Referring to FIGS. 10a-10b, the present invention terminates frame overhead management data internally in a pluggable transceiver or passes the frame overhead management data to a host system. In FIG. 10a, the MDIO or I2C 1020 is configured for on-chip OAM&P access in a pluggable transceiver 1000. The pluggable transceiver 1000 includes circuitry to frame an incoming signal, to add FEC to the signal, and to manage the optical output signal through OAM&P mechanisms. For example, the pluggable transceiver 1000 can include a XENPAK, XPAK, or X2 MSA type transceiver configured to accept XAUI inputs and provide an XFI output with the framing circuitry configured to provide a G.709 optical signal with the XFI signal encapsulated.

The pluggable transceiver 1000 includes circuitry configured to manage OAM&P through the frame overhead. In an example embodiment, the framing technique is G.709 and the pluggable transceiver 1000 is configured to terminate selected overhead bytes from the G.709 overhead to provide for optical layer OAM&P. The data terminated from these bytes can be provided to the host system (i.e. line card, blade) through unused MDIO registers in the MSA specification. For example, XENPAK, XPAK, and X2 include unused MDIO registers reserved for future use. OAM&P access can be implemented on these registers while maintaining compliance with the MSA specification. Pluggable transceiver 1000 provides access to a subset of G.709 management overhead similar to WAN PHY in that it does not terminate all OAM&P on G.709 due to power, space, and host communication constraints, but it does allow for carrier grade OAM&P on the transceiver 1000 without the extra features not current defined or commonly used. From a hardware perspective, the host system is designed to read the MDIO according to the MSA specification. The host system can be modified through software only to read and process the OAM&P data received on the MDIO registers.

With regards to XFP, XFP-E, and SFP+, the OAM&P data access is done through the inter-integrated circuit (I2C) serial bus. I2C is a serial communications bus through which a pluggable transceiver, such as XFP, XFP-E, and SFP+, communicates to the host system. DOM 1010 is an optical monitoring scheme utilized by each MSA specification for performance monitoring on the pluggable transceiver. For example, the DOM 1010 can provide PMs such as optical output power, optical input power, laser bias current, etc.

In FIG. 10b, the frame overhead is configured to pass the frame overhead off-chip in a pluggable transceiver 1050 to a field programmable gate assembly (FPGA) 1060 for terminating the entire frame overhead. The pluggable transceiver 1050 includes circuitry to frame an incoming signal, to add FEC to the signal, and to manage the optical output signal through OAM&P mechanisms. For example, the pluggable transceiver 1050 can include a XENPAK, XPAK, or X2 MSA type transceiver configured to accept XAUI inputs and provide an XFI output with the framing circuitry configured to provide a G.709 optical signal with the XFI signal encapsulated. The pluggable transceiver 1050 includes circuitry configured to manage OAM&P through the frame overhead. In an example embodiment, the framing technique is G.709 and the pluggable transceiver 1050 is configured to terminate selected overhead bytes from the G.709 overhead to provide for optical layer OAM&P. The data terminated from these bytes can be provided to the host system (i.e. line card, blade) through the FPGA 1060. The host system can be modified to receive and process all of the OAM&P from the FPGA 1060. Additionally, FIGS. 10a-10b can include an XFI 10G serial input to both the pluggable transceiver 1000,1050 instead of a XAUI interface.

Figure 11:
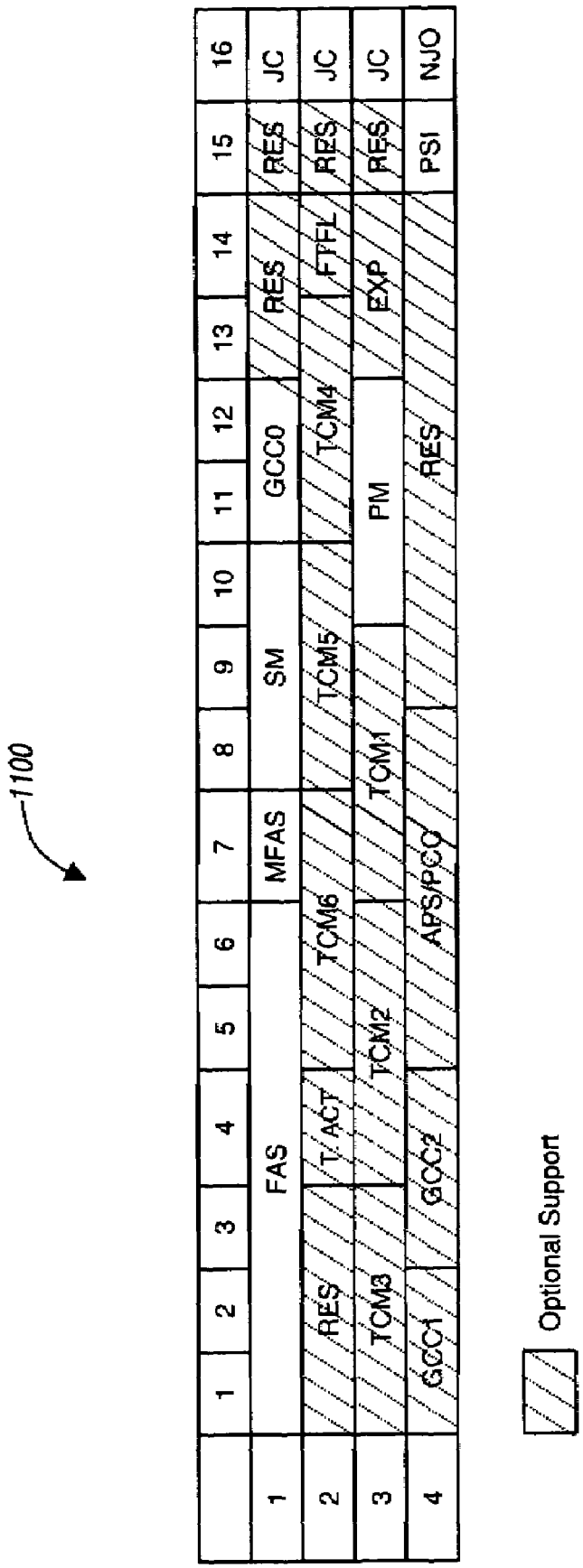
FIG. 11 illustrates the G.709 frame overhead bytes and an example of a sub-set of overhead bytes supported for termination internally to the pluggable transceiver that would be sufficient for carrier grade OAM&P functions.

Referring to FIG. 11, the G.709 overhead 1100 is partitioned into OTU frame alignment bytes in row 1, columns 1-7; ODU overhead bytes in rows 2-4, columns 1-14; OTU overhead bytes in row 1, columns 8-14; and OPU overhead in rows 1-4, columns 15-16. Further, the G.709 overhead 1100 includes FEC data (not shown) in the frame. As discussed in FIGS. 10a-10b, the present invention discloses two methods of terminating frame management overhead by either terminating a subset of the overhead in the pluggable transceiver or by passing the entire overhead off-chip to the host system. In an exemplary embodiment of the present invention, FIG. 11 depicts an example of the subset of G.709 overhead that is terminated on-chip in the pluggable transceiver.

The subset of G.709 overhead terminated on chip includes the frame alignment signal (FAS) bytes and the multi-frame alignment signal (MFAS) which are the OTU frame alignment bytes. Also, the subset of G.709 overhead includes the section monitoring (SM) bytes and the path monitoring (PM) bytes to provide optical layer error management between optical section and path in G.709. The SM bytes include dedicated BIP-8 monitoring to cover the payload signal, and these are accessible at each pluggable transceiver. The first byte of the SM used for Trail Trace Identifier (TTI) which is a 64-byte character string similar to a section trace in SONET. The PM bytes include dedicated BIP-8 monitoring to cover the payload signal, and these are accessible at each pluggable transceiver. The first byte of the PM is used for TTI which is similar to path trace in SONET. The general communication channel 0 (GCC0) bytes provide a communications channel between adjacent G.709 nodes.

Additionally, the subset of G.709 overhead terminated on chip includes the payload signal identifier (PSI), justification control (JC), and negative justification opportunity (NJO). For asynchronous clients such as 10 GbE and 10 G FC, NJO and PJO are used as stuff bytes similar to PDH. If the client rate is lower than OPU rate, then extra stuffing bytes may be inserted to fill out the OPU. Similarly, if the incoming signal to the pluggable transceiver is slightly higher than the OPU rate, NJO and PJO bytes may be replaced with signal information, i.e. the OPU payload capacity is increased slightly to accommodate the extra traffic on the pluggable transceiver, and the JC bytes reflect whether NJO and PJO are data or stuff bytes the JC bytes are used at the off-ramp to correctly de-map the signal. The PSI provides an identification of the payload signal.

Because the current MSA specifications were never envisioned to carry full OAM&P overhead data on and off a pluggable transceiver, the present invention provides a subset of OAM&P access to minimize power, space, cost, and host communications in the circuitry on the pluggable transceiver to fit within the MSA specification and to continue offering the benefits of pluggable transceivers such as low cost. However, this subset of OAM&P still allows network operators to realize carrier-grade optical layer performance monitoring directly off pluggable transceivers without additional hardware. Further, the above exemplary embodiment with G.709 OAM&P can be utilized in any framing technique on a pluggable transceiver. The subset of G.709 overhead terminated in FIG. 11 can be modified depending on the application requirements.

Figures 12A, 12B:
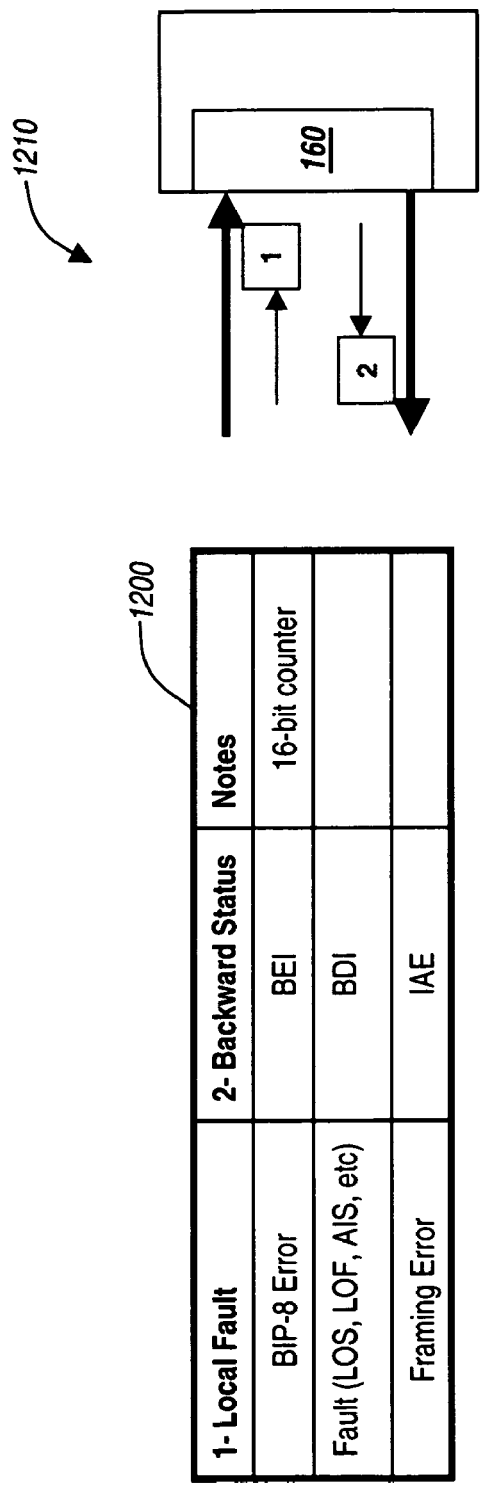
FIGS. 12a-12b illustrate an exemplary embodiment of frame error reporting in G.709 and network discovery and connection management.

Referring to FIGS. 12a-12b, an exemplary embodiment of frame error reporting in G.709 is depicted in FIG. 12a and an exemplary embodiment of network discovery and connection management is depicted in FIG. 12b. FIG. 12a includes a table 1200 illustrating local faults 1 such as a BIP-8 error, fault (loss-of-signal, loss-of-frame, alarm indication signal, etc.), and framing error along with the corresponding backward status 2. Network element 1210 is equipped with a pluggable transceiver 160 equipped with a TX and RX and configured to provide overhead and framing internal to the transceiver 160. The local fault 1 is seen on the RX side of transceiver 160 and the corresponding backward status 2 is transmitted over the overhead. In an exemplary embodiment, the MDIO reports OTU BIP-8 error counts for the near end (NE) and far end (FE) in a 16-bit register, ODU BIP-8 error counts for the NE and FE in a 16-bit register, and the corrected FEC error count for the NE in a 32-bit register.

FIG. 12b includes a table 1250 illustrating a TTI byte used for connection management and network discovery. The pluggable transceiver of the present invention includes OTU and ODU trail trace identifier (TTI) support through, for example, the 64-byte G.709 standard implementation which includes a 16-byte SAPI/DAPI, and a 32-byte user specific field. This implementation is backward compatible with 16-byte 10 GbE WAN PHY implementations. Further, the pluggable transceiver supports a TTI mismatch alarm.

In an exemplary embodiment of the present invention providing G.709 framing support in a pluggable transceiver, the pluggable transceiver can be configured to provide support of G.709 standardized alarms for fault isolation including:

| Alarms | Description |
| --- | --- |
| LOS | Loss of Signal |
| LOF | Loss of Frame |
| OOF | Out of Frame |
| OOM | Out of Multi Frame |
| OTU-AIS | Alarm Indication Signal |
| OTU-IAE | Incoming Alignment Error |
| OTU-BDI | Backward Defect Indicator |
| ODU-AIS | Alarm Indication Signal |
| ODU-OCI | Open Connection indicator |
| ODU-LCK | Locked |
| ODU-BDI | Backward Error indicator. |
| FAS | Frame Alignment Error |
| MFAS | Multi Frame Alignment Error |
| OTU TTI-M | OTU TTI Mismatch |
| ODU TTI-M | ODU TTI Mismatch |

Further, the MDIO interface provides full control support of the pluggable transceiver including:

| Control | Description |
| --- | --- |
| Loop back | Loop back towards client |
| Loop back | Loop back towards line |
| Low Power | Low Power mode |
| Reset | Reset |
| PRBS31 enable | PRBS payload test pattern |
| Test Pattern Selection | Square Wave or Mixed Frequency |

Further, the pluggable transceiver module status and error registers include the following:

| Status | Description |
| --- | --- |
| Fault | Fault Yes/No |
| Link Status | Link Up or Down |

| PMs Registers | |
| --- | --- |
| OTU BIP NE | OTU BIP Errors - Near End |
| OTU BIP FE | OTU BIP Errors - Far End |
| ODU BIP NE | ODU BIP Errors - Near End |
| ODU BIP FE | ODU BIP Errors - Far End |
| OTU FEC Corrected | OTU FEC Corrected |
| OTU Uncorrected errors | OTU Uncorrected errors |
| BER | Bit Error Rate |

Figure 13:
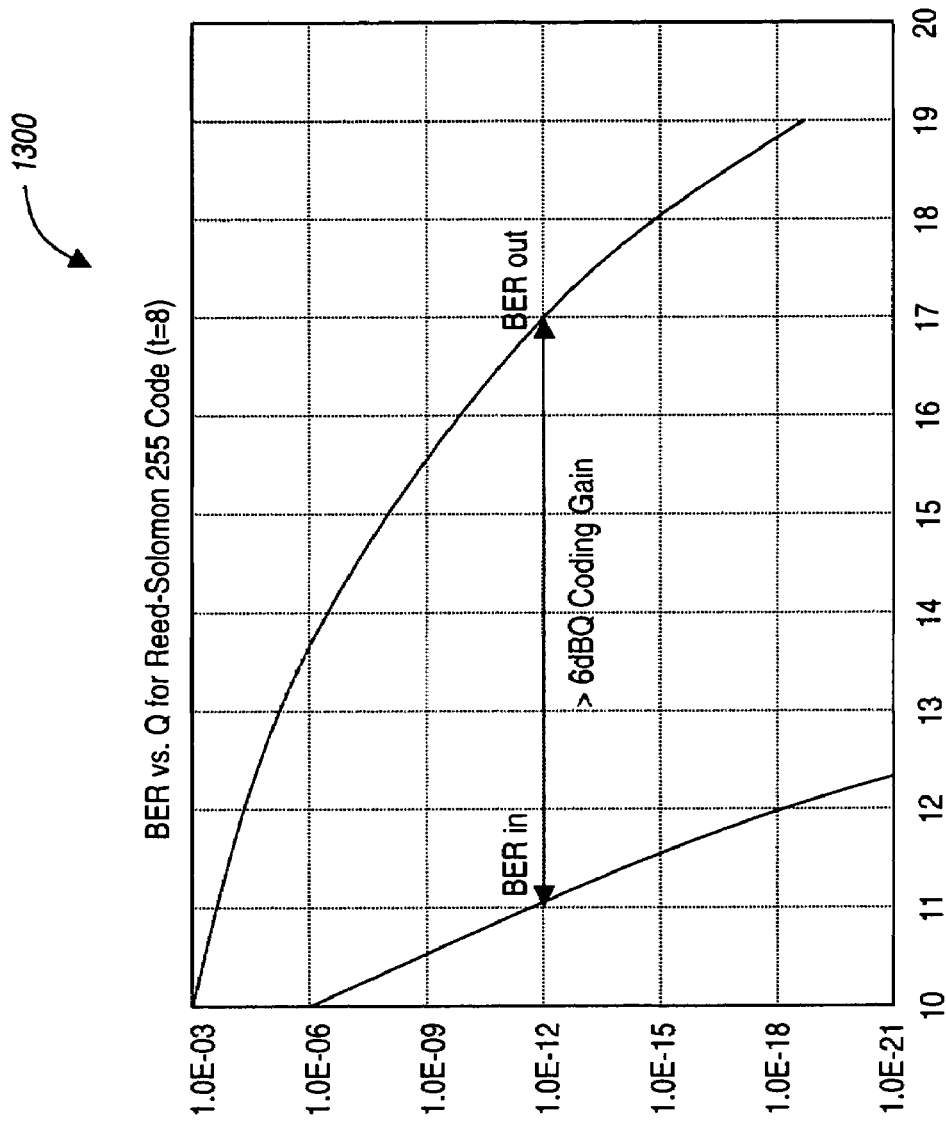
FIG. 13 illustrates a graph of coding gain resulting from the Reed Solomon FEC code, RS (255, 239).

Referring to FIG. 13, the Reed Solomon FEC code, RS (255, 239), provides 6 dB or more of coding gain to an optical signal. FEC codes operate by encoding additional overhead on a signal at the transmit stage and decoding at the receive stage to utilize the additional overhead to correct errors in the received signal. In optical systems, FEC has been utilized to increase optical margin, to increase transmission distances, lower cost, and relax component specifications in design. The pluggable transceivers of the present invention are configured to implement FEC internally in a pluggable transceiver by encoding FEC overhead on a signal and decoding at the receive stage. In an exemplary embodiment of the present invention, the pluggable transceiver is configured to implement RS (255, 239) as specified by the G.709 standards. The present invention is also applicable to utilize any other FEC algorithm capable of implementation within the confines of power, space, and line-rate associated with the pluggable transceiver MSA specifications. Graph 1300 illustrate bit-error rate (BER) vs. signal quality Q and shows an input BER (BER in) versus the output BER (BER out) after the FEC is processed and errors corrected in the pluggable transceiver. As shown in FIG. 13, a FEC code such as RS (255, 239) provides 6 dB or more coding gain for a BER of 10e-12. This coding gain can be utilized in pluggable transceivers to extend the reach beyond 80 km, to loosen component specifications in the transceiver, and to provide robust carrier-grade performance.

Figure 14:
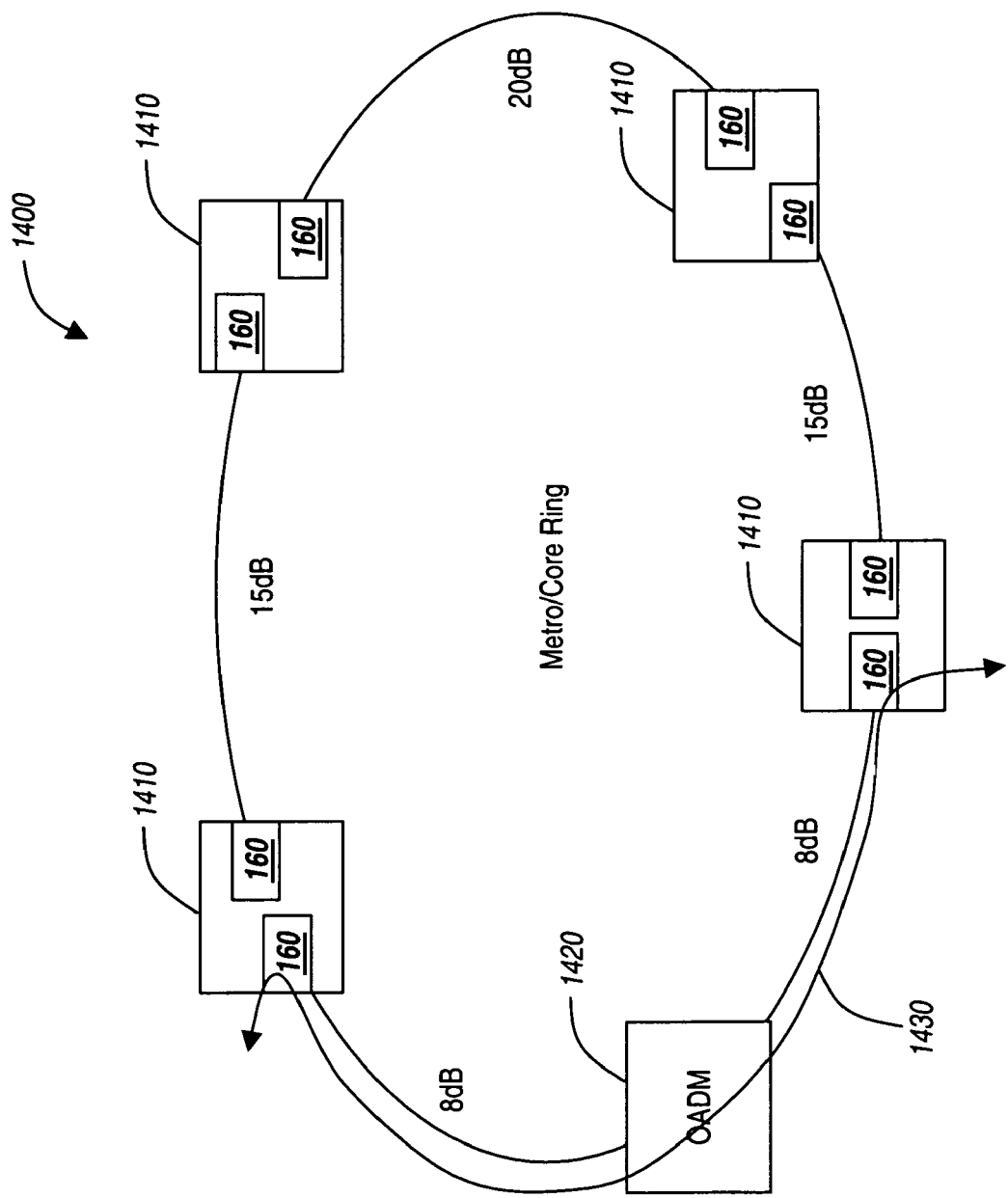
FIG. 14 illustrates an exemplary application of pluggable transceivers of the present invention in a metro/core ring.

Referring to FIG. 14, an exemplary application of the present invention includes a metro/core ring 1400 including optical terminals 1410 and an optical add-drop multiplexer (OADM) 1420. The optical terminals 1410 include network elements with line cards or blades configured with optical pluggable transceivers 160 of the present invention. The pluggable transceivers 160 support framing, optical layer OAM&P, and FEC directly without the need for additional equipment such as transponders. Examples of optical terminals 1410 include routers, Ethernet switches, servers, MSPPs, SONET add-drop multiplexers, DWDM terminals, and cross-connects. The metro/core ring 1400 includes multiple optical terminals 1410 in a ring topology with each optical link including an east and west transceiver 160. Additionally, a single OADM 1420 is including in the metro/core ring 1400 where no transceivers 160 are equipped.

The pluggable transceivers 160 of the present invention support robust, carrier-grade features directly, allowing the application space for pluggable transceivers to move beyond short, interconnect applications. In metro/core ring 1400, the pluggable transceivers 160 of the present invention reduce the amount of amplifiers required, enable more flexible routing options for wavelengths, and provide overall more design flexibility. Existing pluggable transceivers are generally limited to less than 80 km (20 dB or less) and offer no optical layer OAM&P. The present invention extends the benefits of pluggable transceivers into metro, regional, and core applications.

Figure 15:
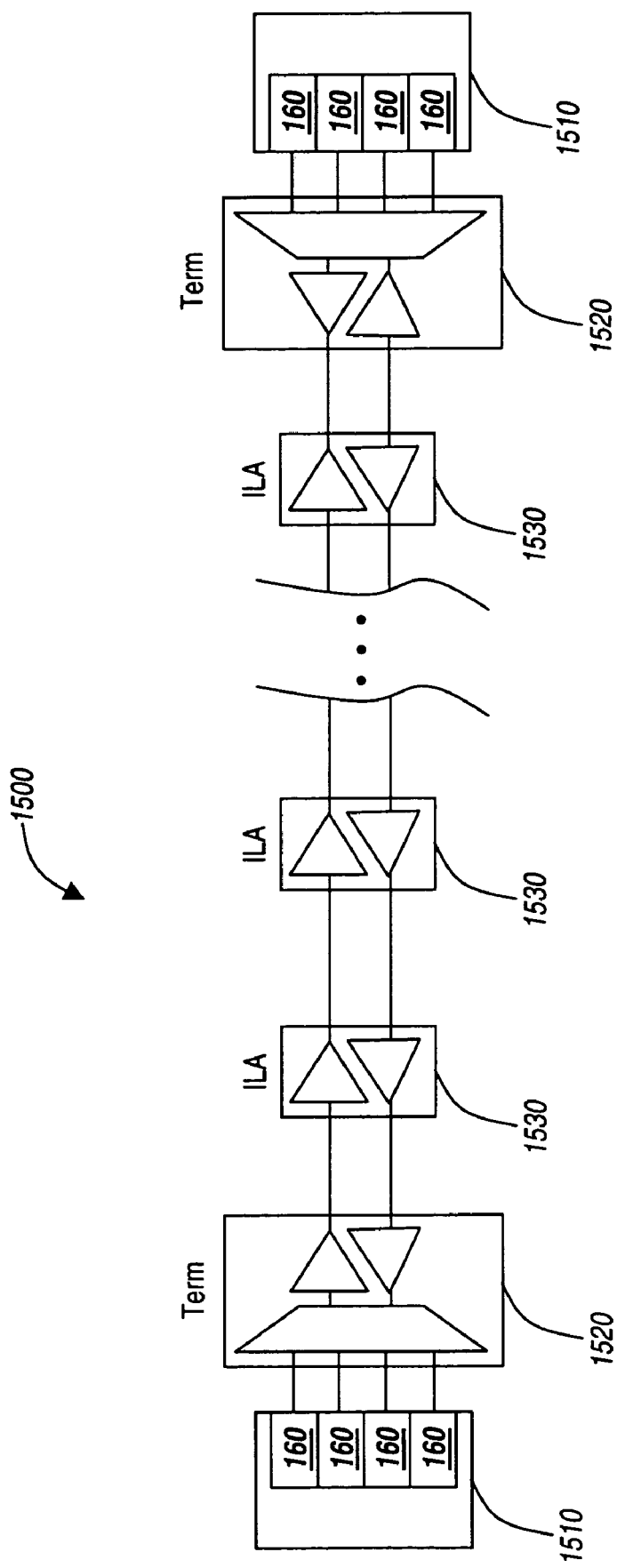
FIG. 15 illustrates an exemplary application of pluggable transceivers of the present invention in a regional/core DWDM system.

Referring to FIG. 15, a regional/core DWDM system 1500 includes a terminal 1510 equipped with multiple pluggable transceivers 160 connected to an optical terminal 1520, multiple inline line amps (ILA) 1530, and another optical terminal 1520 and terminal 1510. The terminals 1510 can include DWDM terminals, MSPPs, SONET ADMs, routers, switches, and cross-connects. Traditionally, terminals 1510 included pluggable transceivers for short, interconnect applications to another device such as a transponder. The pluggable transceiver 160 of the present invention eliminates the need for transponders by supporting framing, optical layer OAM&P, and FEC internally to the transceiver 160. The present invention supports a greater than 2.5 times distance increase over traditional pluggable transceivers. For example, distances up to 800 km with ILAs 1530 can be achieved with the present invention. Further, the pluggable transceiver 160 supports any optical wavelength type including DWDM wavelengths, eliminating the requirement for transponders to convert to a DWDM wavelength.

The present invention, by incorporating framing such as G.709 and FEC in pluggable transceivers specified by MSAs, significantly enhances performance and OAM&P functions. This allows pluggable transceivers to be used in IP/Ethernet/ATM/Frame Relay/Fiber Channel over WDM, high density/high performance applications, G.709 interconnection applications, and applications requiring comprehensive optical OAM&P. Traditionally, pluggable transceivers have accorded benefits to equipment vendors and network operators such as engineering re-use, streamlined manufacturing and sparing, low cost and multiple manufacturing sources. The present invention builds upon the existing benefits of pluggable transceivers by increasing the application space of pluggable transceivers from short, interconnect applications to metro, regional, and core network applications requiring carrier-grade, robust monitoring and performance.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A pluggable optical transceiver defined by a multi-source agreement, the pluggable optical transceiver comprising integrated circuitry configured to frame a signal with overhead for operations, administration, maintenance, & provisioning (OAM&P) functions necessary for optical transport networks (OTN) applications and to process OAM&P data within the pluggable optical transceiver, wherein the integrated circuitry is configured to frame the signal with a G.709 frame and the overhead comprises G.709 management data; and a communication mechanism compliant to the multi-source agreement, wherein the communication mechanism is adapted to communicate the processed OAM&P data to a host system;

wherein the pluggable optical transceiver with the integrated circuitry and the communication mechanism preserves the specifications for the multi-source agreement defining the pluggable optical transceiver;

wherein a subset of the G.709 management data is accessible and terminated on the pluggable optical transceiver; wherein the subset is selected responsive to limitations in the communication mechanism of the multi-source agreement; and wherein the G.709 management data is communicated through mechanisms fully supported by the multi-source agreement with only software re-design in the host system.

2. The pluggable optical transceiver of claim 1, wherein the overhead in the overhead comprises forward error correction overhead for performance enhancement and reach extension and the integrated circuitry is configured to correct errors in an optical signal utilizing the forward error correction overhead.

3. The pluggable optical transceiver of claim 2, wherein the integrated circuitry is configured to provide real-time monitoring of an optical link and historical bit-error rate data based on the correction of errors with the forward error correction overhead, and wherein the real-time monitoring is performed by the integrated circuitry.

4. The pluggable optical transceiver of claim 1, wherein the pluggable optical transceiver is utilized in any of Internet Protocol over wavelength division multiplexing, asynchronous transfer mode over wavelength division multiplexing, Ethernet over wavelength division multiplexing, frame relay over wavelength division multiplexing, and fiber channel over wavelength division multiplexing applications.

5. The pluggable optical transceiver of claim 1, wherein the pluggable optical transceiver is utilized in high-density, input-output applications and in G.709 interconnection applications.

6. The pluggable optical transceiver of claim 1, wherein the communication mechanism is adapted to communicate the processed OAM&P data to the host system utilizing unused registers to communicate to the host system in a manner fully supported by the multi-source agreement.

7. The pluggable optical transceiver of claim 1, wherein the pluggable optical transceiver is utilized in applications requiring comprehensive operations, administration, maintenance, & provisioning support.

8. The pluggable optical transceiver of claim 1, wherein the multi-source agreement comprises any of XFP, XPAK, XENPAK, X2, XFP-E, and SFP+.

9. A pluggable optical transceiver defined by a multi-source agreement, the pluggable optical transceiver comprising:
   integrated circuitry configured to frame a signal with overhead for operations, administration, maintenance, & provisioning (OAM&P) and to process OAM&P data within the pluggable optical transceiver, wherein the integrated circuitry is configured to frame the signal with a G.709 frame and the overhead comprises G.709 management data;
   integrated forward error correction circuitry, the circuitry is configured to add forward error correction overhead to a transmitted signal and to process forward error correction overhead on a received signal to correct errors;
   a communication mechanism compliant to the multi-source agreement, wherein the communication mechanism is adapted to communicate the processed OAM&P data to a host system;
   wherein the pluggable optical transceiver with the integrated circuitry configured to frame a signal and the integrated forward error correction circuitry preserves the specifications for the multi-source agreement defining the pluggable optical transceiver thereby enabling the pluggable optical transceiver comprising integrated forward error correction circuitry to operate in a host system compliant to the multi-source agreement with only software re-design of the host system; and
   wherein a subset of the G.709 management data is accessible and terminated on the pluggable optical transceiver; wherein the subset is selected responsive to limitations in the communication mechanism of the multi-source agreement; and wherein the G.709 management data is communicated through mechanisms fully supported by the multi-source agreement with only software re-design in the host system.

10. The pluggable optical transceiver of claim 9,
   wherein the forward error correction circuitry is configured to frame the optical signal with a G.709 frame, the G.709 frame comprises overhead for operations, administration, maintenance, & provisioning (OAM&P) overhead and the forward error correction overhead; and
   wherein the forward error correction circuitry is further configured to process OAM&P data within the pluggable optical transceiver; and
   wherein the pluggable optical transceiver further comprises a communication mechanism compliant to the multi-source agreement adapted to communicate the processed OAM&P data to the host system.

11. The pluggable optical transceiver of claim 10, wherein the pluggable optical transceiver is utilized in any of Internet Protocol over wavelength division multiplexing, asynchronous transfer mode over wavelength division multiplexing, Ethernet over wavelength division multiplexing, frame relay over wavelength division multiplexing, and fiber channel over wavelength division multiplexing applications.

12. The pluggable optical transceiver of claim 10, wherein the pluggable optical transceiver is utilized in high-density, input-output applications and G.709 interconnection applications.

13. The pluggable optical transceiver of claim 10, wherein the communication mechanism is adapted to communicate the processed OAM&P data to the host system utilizing unused registers to communicate to the host system in a manner fully supported by the multi-source agreement.

14. The pluggable optical transceiver of claim 10, wherein the pluggable optical transceiver is utilized in applications requiring comprehensive operations, administration, maintenance, & provisioning support.

15. The pluggable optical transceiver of claim 9, wherein the multi-source agreement comprises any of XFP, XPAK, XENPAK, X2, XFP-E, and SFP+.

16. A pluggable optical transceiver defined by one of the XPAK, XENPAK, or X2 multi-source agreements, the pluggable optical transceiver comprising:
   G.709 framing circuitry integrated into the pluggable optical transceiver, the G.709 framing circuitry is configured to:
   frame an incoming signal with a G.709 frame comprising G.709 management overhead and forward error correction overhead and provide the signal in the G.709 frame to an optical transmitter;
   un-frame an incoming G.709 signal from an optical receiver and provide the unframed signal to a XAUI-XFI transceiver;
   process G.709 management overhead and forward error correction overhead on the incoming G.709 signal; and
   communicate the processed G.709 management overhead to a host system compliant to one of the XPAK, XENPAK, or X2 specifications through a communication mechanism comprising unused registers in a manner fully supported by one of the XPAK, XENPAK, or X2 specifications;
   wherein the pluggable optical transceiver integrated with the framing circuitry preserves one of the XPAK, XENPAK, or X2 specifications.

17. The pluggable optical transceiver of claim 16, wherein the G.709 framing circuitry is further configured to:
   pass the entire G.709 management overhead to a host system through mechanisms supported by one of the XPAK, XENPAK, or X2 specifications; and
   correct errors responsive to the forward error correction overhead and pass corrected error statistics to the host system through mechanisms supported by one of the XPAK, XENPAK, or X2 specifications.

18. The pluggable optical transceiver of claim 16, wherein the G.709 framing circuitry is integrated into the XAUI-XFI transceiver, the XAUI-XFI transceiver comprises an application specific integrated circuit.

19. The pluggable optical transceiver of claim 16, wherein the G.709 framing circuitry is further configured to:
   terminate a subset of the G.709 management overhead and pass the terminated overhead to a host system through mechanisms supported by one of the XPAK, XENPAK, or X2 specifications, wherein the subset is selected responsive to limitations in the communication mechanism of one of the XPAK, XENPAK, or X2 specifications; and correct errors responsive to the forward error correction overhead and pass corrected error statistics to the host system through mechanisms supported by one of the XPAK, XENPAK, or X2 specifications.

20. The pluggable optical transceiver of claim 19, wherein the subset of G.709 management overhead and the forward error correction overhead are passed to the host system through a management data input/output interface.

21. The pluggable optical transceiver of claim 20, wherein the management data input/output interface utilizes unused registers based on one of the XPAK, XENPAK, or X2 specifications to pass the subset of G.709 management overhead and the forward error correction overhead to the host system.

22. The pluggable optical transceiver of claim 20, wherein a field programmable gate assembly bridges the management data input/output between the XAUI-XFI transceiver and the G.709 framing circuitry to provide a single, MSA-compliant management data input/output to the host system.

23. A pluggable optical transceiver defined by one of the XFP, XFP-E, or SFP+ multi-source agreements, the pluggable optical transceiver comprising:

G.709 framing circuitry integrated into the pluggable optical transceiver, the G.709 framing circuitry is configured to:

frame an incoming signal with a G.709 frame comprising G.709 management overhead and forward error correction overhead and provide the signal in the G.709 frame to an optical transmitter;

un-frame an incoming G.709 signal from an optical receiver and provide the unframed signal to a host system;

process G.709 management overhead and forward error correction overhead on the incoming G.709 signal; and communicate the processed G.709 management overhead to a host system compliant to one of the XFP, XFP-E, or SFP+ specifications through a communication mechanism comprising unused registers in a manner fully supported by one of the XFP, XFP-E, or SFP+ specifications;

wherein the pluggable optical transceiver integrated with the framing circuitry preserves the XFP, XFP-E, or SFP+ specifications.

* * * * *